United States Patent [19]

Ota

[11] Patent Number: 5,559,784
[45] Date of Patent: Sep. 24, 1996

[54] MULTI-LAYER OPTICAL INFORMATION DETECTION BY TWO LASER BEAM AND OPTICAL MULTILAYER RECORDING MEDIUM

[75] Inventor: Takeshi Ota, Kanagawa, Japan

[73] Assignee: Fuji Xerox Co., Ltd., Tokyo, Japan

[21] Appl. No.: 217,353

[22] Filed: Mar. 25, 1994

[30] Foreign Application Priority Data

Mar. 26, 1993 [JP] Japan .................................... 5-068694
Mar. 26, 1993 [JP] Japan .................................... 5-068721
Feb. 28, 1994 [JP] Japan .................................... 6-030184

[51] Int. Cl.$^6$ .................................................. G11B 7/00
[52] U.S. Cl. .......................... 369/124; 369/107; 369/112; 369/120; 369/44.37; 369/283; 369/288
[58] Field of Search .............................. 369/100.13, 103, 369/112, 44.23, 44.37, 44.41, 44.39, 275.1, 275.4, 288, 283, 107, 120; 430/271, 945

[56] References Cited

U.S. PATENT DOCUMENTS

| | | | |
|---|---|---|---|
| 4,465,767 | 8/1984 | Oba et al. ................................. | 430/271 |
| 5,105,410 | 4/1992 | Maeda et al. ........................ | 369/44.37 |
| 5,144,606 | 9/1992 | Kadowaki ................................ | 369/103 |
| 5,315,573 | 5/1994 | Nakao et al. ............................ | 369/288 |
| 5,381,391 | 1/1995 | Yanagisawa et al. ...................... | 369/13 |

FOREIGN PATENT DOCUMENTS

| | | |
|---|---|---|
| 4-49535 | 2/1982 | Japan . |
| 61-18392 | 5/1986 | Japan . |
| 2-192053 | 7/1990 | Japan . |

OTHER PUBLICATIONS

Y. Hashimoto, Y. Kawata, S. Kawata, "Three-dimensional Cconfocal Optical Memory with Photorefractive Materials," Optics Joint Symposium Kyoto '92, 1992, pp. 39–40.

T. Suhara, H. Nishihara, "Possibility of Super-Resolution Readout in Optical Disc Pickup Heads," Optics, vol. 21, No. 7, 1992, pp. 442–450.

Primary Examiner—Georgia Y. Epps
Assistant Examiner—Kim-Kwok Chu
Attorney, Agent, or Firm—Finnegan, Henderson, Farabow, Garrett & Dunner, L.L.P.

[57] ABSTRACT

An optical information reproducing apparatus having an optical recording medium in which information is recorded in a state that it is optically reproduced, and an optical head for reproducing the recorded information from the recording medium while moving relatively to the recording medium. In the apparatus, images are formed on the recording medium by two laser beams emitted from a light source of the optical head, and the difference between the two laser beams transmitted through the recording medium or reflected by the recording medium is detected.

32 Claims, 25 Drawing Sheets

FIG. 4
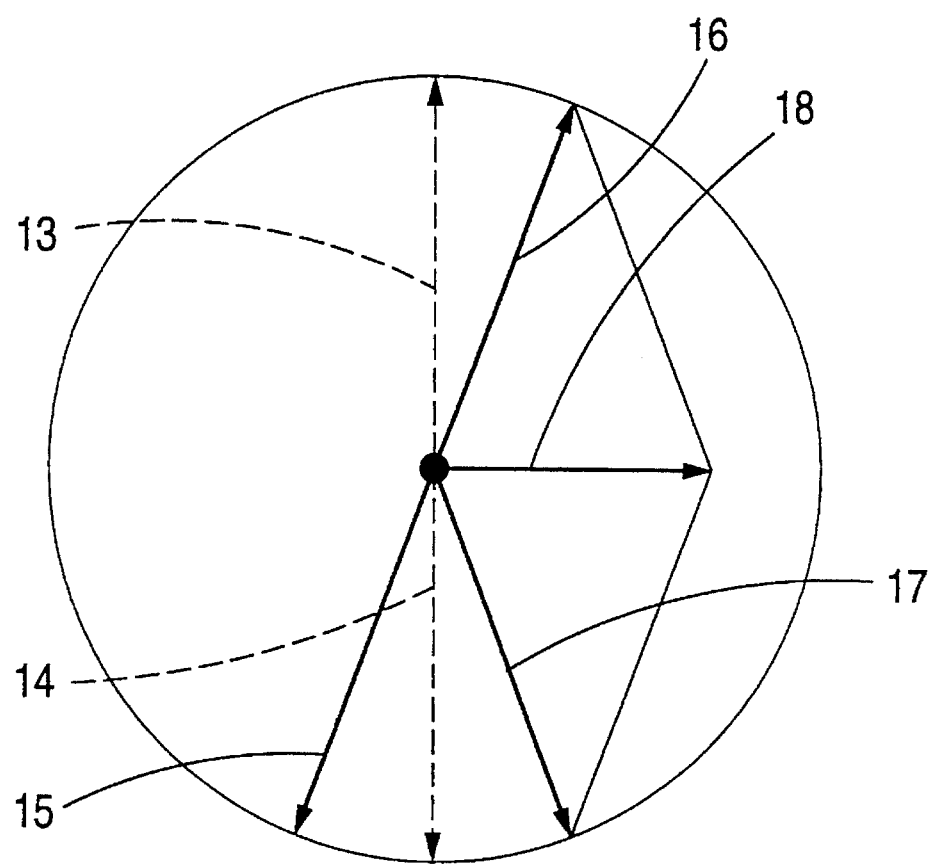
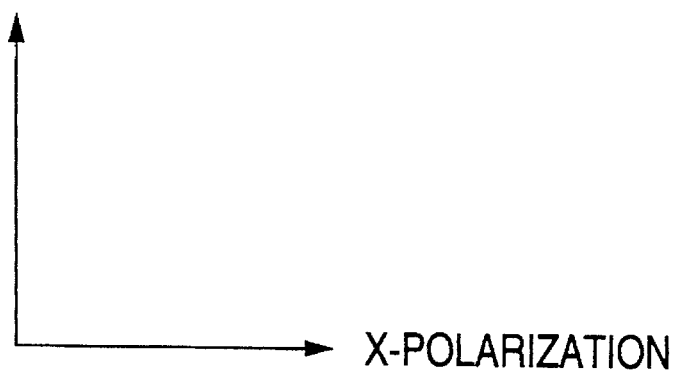

FIG. 5 (a)
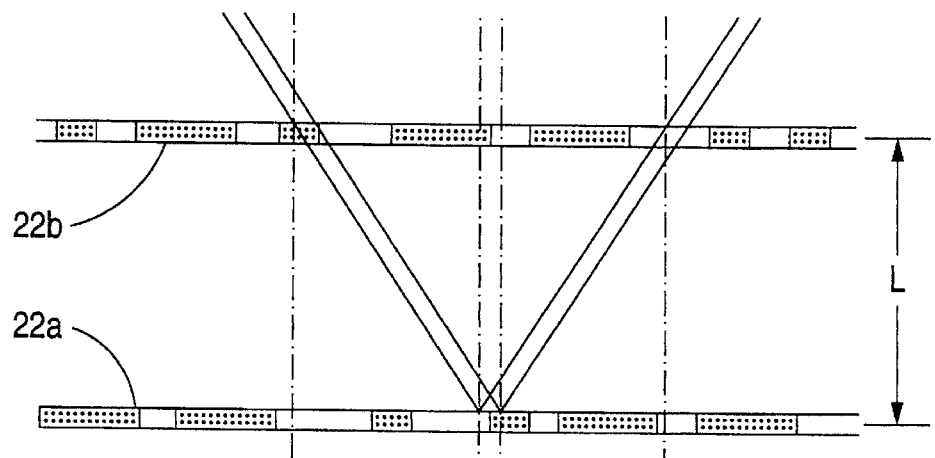
FIG. 5 (b)
FIG. 5 (c)
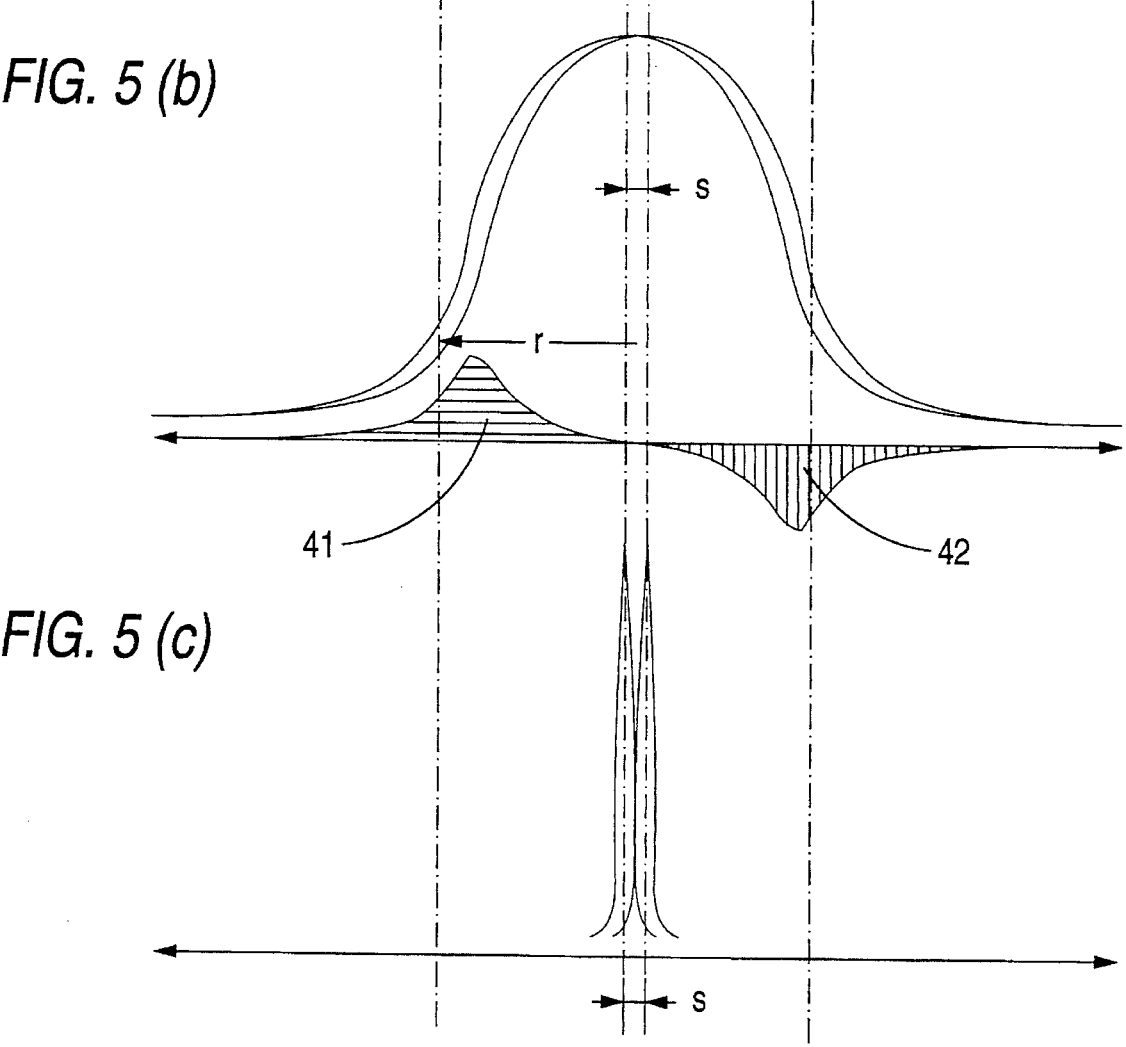

5,559,784

MULTI-LAYER OPTICAL INFORMATION DETECTION BY TWO LASER BEAM AND OPTICAL MULTILAYER RECORDING MEDIUM

BACKGROUND OF THE INVENTION

1. Field of the Invention

The present invention relates to an optical information reproducing apparatus for reproducing information from an optical recording medium, such as an optical disk or an optical card, in which the information is stored in a state that it is optically reproduced. More particularly, the invention relates to an optical information reproducing apparatus for reproducing information from an information recording medium in which information is recorded in a multi-layer fashion.

2. Discussion of the Related Art

In general optical recording media, such as optical disks, store information in a two-dimensional plane. Constant pressure to increase the record capacity of the recording medium has led to another information recording approach in which information is three-dimensionally recorded. Haslhimoto, Kawada, and Kawada describe an example in which information is three-dimensionally recorded in a photo polymer in which the refractive index varies with light received, in their paper "Co-focal Point 3-Dimensional Photo Refractive Optical Memory", Optics Joint Symposium Kyoto, '92, BaO3 (1992).

FIG. 28 is a diagram schematically showing a conventional information reproducing apparatus for reading information out of an optical multi-layer recording medium in which the information is three-dimensionally stored. An optical multi-layer recording medium 94 is a bulky photo polymer in which information is three-dimensionally stored. The refractive index of record pits 95a and 95b is different from that of the surrounding polymer. Because of this, light reflection takes place at the interface between each of the record pits 95a and 95b and its surrounding polymer. In the reproducing apparatus of FIG. 28, a light beam reflected at the interface is read by a scanning optical microscope of the cofocal point type. The laser beam emitted from a laser light source 91 goes through a half-mirror 92 and a lens 93, and is focused at a record pit 95a. The laser beam reflected at the position of the record pit 95a goes through the lens 93, the half-mirror 92 and an aperture 96, and reaches a photo sensing device 97. The record pit 95a is optically conjugate with the aperture 96. The reflected light beams from the record pit 95b located above the record pit 95a are not focused at the aperture 96. Accordingly, the recorded information can be separated to some extent in the direction of depth. The optical multi-layer recording medium 94 is three-dimensionally movable by a three-dimensional stage 98.

In the conventional apparatus shown in FIG. 28, the difference of refractive index between each record pit and its surrounding polymer causes light beam reflection. Therefore, in making an access to a lower recording layer, a probe light beam is inevitably attenuated until it reaches the lower recording layer. This results in an insufficient S/N ratio in the depth direction.

SUMMARY OF THE INVENTION

The present invention has been made in view of the above circumstances and has an object to provide an optical information reproducing apparatus which can reproduce information from an optical multi-layer recording medium, with little influence by a recording layer not being addressed or under access, viz., with little interlayer cross talk.

Another object of the present invention is to provide an optical multi-layer recording medium which allows information to be read out therefrom, with little influence by a recording layer not being addressed or under access, viz., with little interlayer cross talk.

To achieve the above objects, the invention provides an optical information reproducing apparatus including an optical recording medium in which information is recorded in a state that the information is optically reproduced, and an optical head for reproducing the recorded information from the recording medium while moving relatively to the recording medium, the optical head including a light source unit for emitting two laser beams, an image-forming optical system for forming images by the two laser beams emitted from the light source unit on the recording medium, and means for detecting a difference between the two laser beams transmitted through the recording medium or reflected by the recording medium.

Further, the invention provides an optical recording medium including a substrate transparent to a probe light beam, and a recording layer formed on the transparent substrate, the recording layer including a first region of a first refractive index and a second region of a second refractive index, and a difference of the first and second refractive indices being detected on the basis of the probe light beam transmitted through the transparent substrate.

Furthermore, the invention provides a method for recording information in an optical multi-layer recording medium including a substrate, recording layers and transparent spacer layers being alternately layered on the substrate, the recording layers each being made of a material having a physical property nonlinearly varying with an intensity of light received, by means of light of a first wavelength capable of nonlinearly varying the physical property.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 4 is a vector diagram showing the principle of detecting a variation of polarized state in the optical information reproducing apparatus of FIG. 1;

FIGS. 5(a) to 5(c) are diagrams showing a relationship of energy distributions of laser beams in a recording layer under access and another recording layer located above the addressed recording layer;

DETAILED DESCRIPTION OF THE PREFERRED EMBODIMENTS

Figure 1:
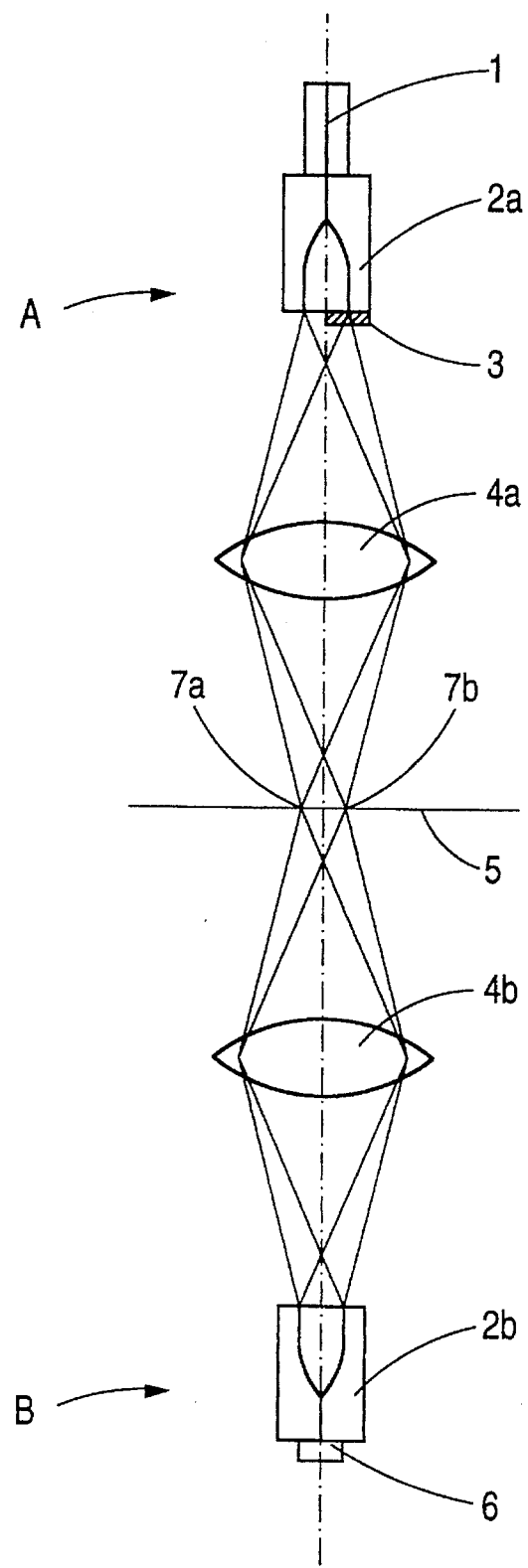
FIG. 1 is a view developed in a plane including an optical axis of the optical system of a first embodiment of an optical information reproducing apparatus according to the present invention.

FIG. 1 is a diagram schematically showing an optical information reproducing apparatus according to a first embodiment of the present invention. In the figure, reference numeral 1 designates a semiconductor laser; 2a and 2b, waveguide optical couplers; 3, a phase shifter; 4a and 4b, lenses; 5, a multi-layer recording medium; and 6, a photo sensing device.

A laser beam emitted from the semiconductor laser 1 is split into two beams by the optical coupler 2a. The first laser beam is emitted, as it is, from the optical coupler 2a, while the second laser beam is emitted through the phase shifter 3. The phase shifter 3 shifts the phase of the second laser beam by 180°. The two laser beams, the first and second laser beams, emanating from the optical coupler land on specific recording layers of the multi-layer recording medium 5, so that a light spot 7b is formed by the first laser beam, and a light spot 7a, by the second laser beam. The first and second laser beams function as probe light beam to read out recorded information. The two laser beams, after passing through the multi-layer recording medium 5, enter another optical coupler 2b where it is multiplexed by the lens 4b, and led to the photo sensing device 6.

The semiconductor laser 1, the optical coupler 2a, the phase shifter 3, and the like make up a light source unit A. The optical coupler 2b, the photo sensing device 6, and the like make up an optical difference detecting unit B.

The light source unit A, which causes a phase difference of 180° between the two probe light beams, may be constructed with a Wollaston prism and a polarizer as described in Japanese Patent Unexamined Publication No. Hei. 4-49535, or a diffraction grating. A phase-locked laser device, coupled in an opposite-phase state, may be used as a light source.

Figure 2:
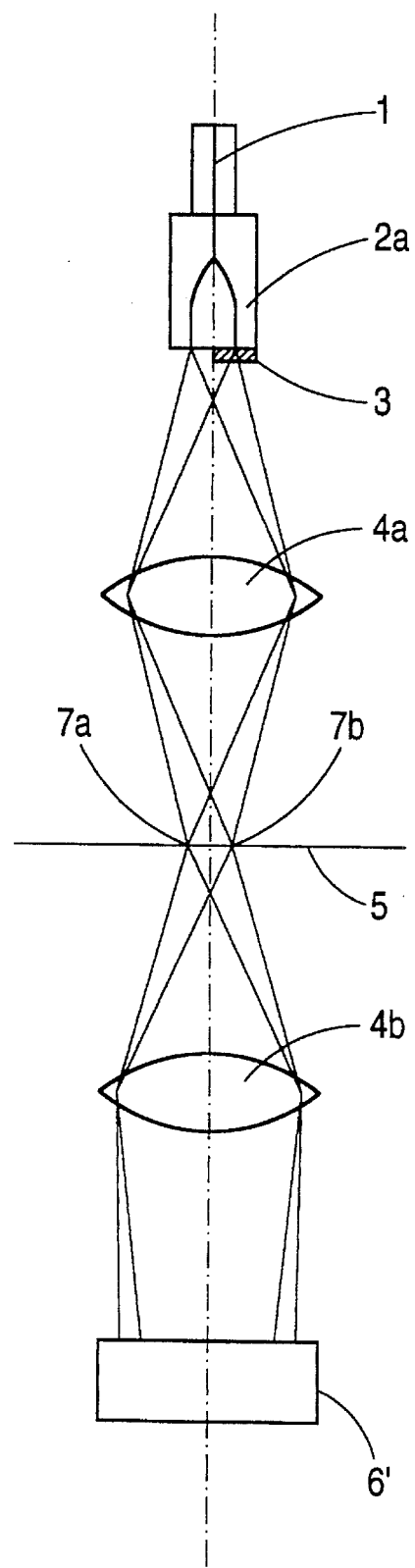
FIG. 2 is a view developed in a plane including an optical axis of the optical system of an optical information reproducing apparatus using another optical difference detecting unit.

The optical difference detecting unit B may be constructed as shown in FIG. 2. As shown, two laser beams transmitted through the multi-layer recording medium 5 are made substantially parallel by the lens 4b, and led to a photo sensing device 6'. The two laser beams are superposed on the light receiving surface of the photo sensing device 6'.

The way to superpose the laser beams is most suitable for the case that the photo sensing device 6' is disposed at the location where the optical axes of the two laser beams, substantially parallel, intersect. In this case, the light receiving surface of the photo sensing device 6' is preferably placed at the position of the diffracted light of the 0-th order (the position where the two beams are neutralized); otherwise interference fringes take place.

In the construction of FIG. 2, the opposite-phase coupled phase-locked laser device may be used as a light source. Use of the phase-locked laser device simplifies the construction of the optical information reproducing apparatus. The phase-locked laser device consists of an array of two gain guide semiconductor lasers each of the stripe width 1 to 5 μm, of which the optical axes are spaced approximately 5 to 20 μm. It is known that the two semiconductor lasers, if the optical coupling condition is properly set up, oscillate in an opposite-phase state.

The optical information reproducing apparatus shown in FIG. 1 can detect transmittance difference, refractive index difference, and polarization plane difference in the recording medium.

Let us consider a case where information is recorded in the optical multi-layer recording medium in terms of a variation of the transmittance thereof.

Figure 3:
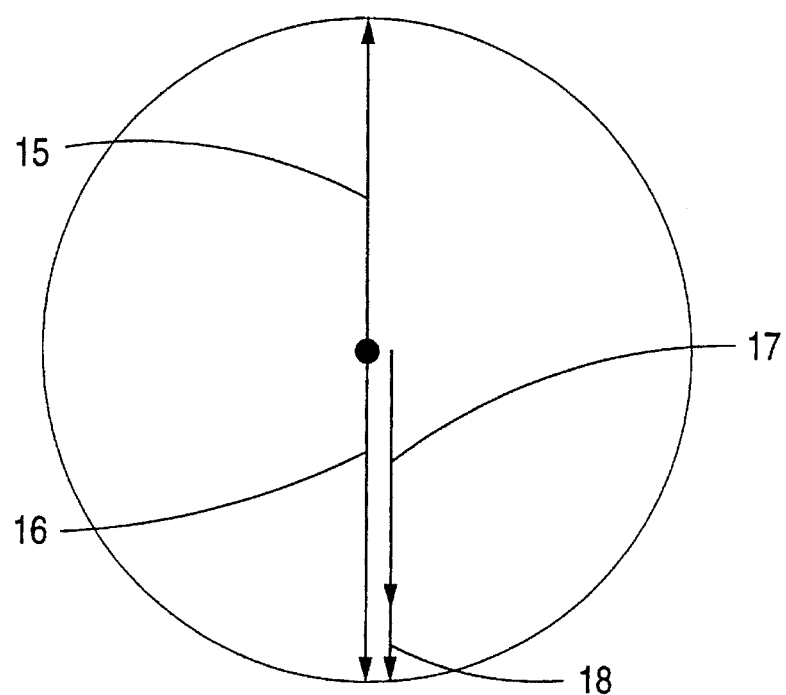
FIGS. 3(a) and 3(b) are vector diagrams showing the principles of detecting variations of transmittance and refractive index in the optical information reproducing apparatus of FIG. 1.
Figure 3:
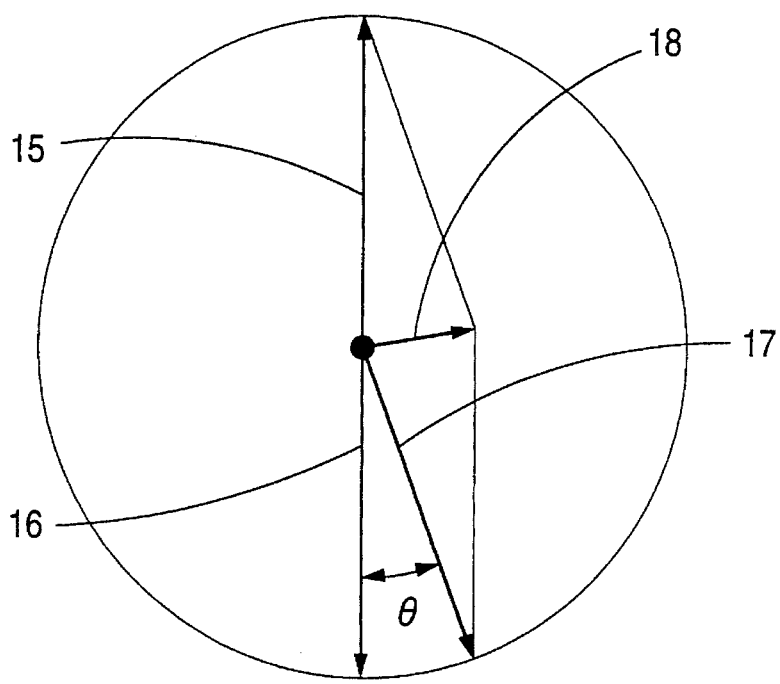

As shown in FIG. 3(a), reference numeral 15 designates an electric field vector of the first probe light beam after it passes the light spot 7b. An electric field vector of the second probe light beam after it passes the light spot 7a is that designated by reference numeral 16 when the transmittance values at the light spots 7a and 7b are equal to each other. When the transmittance values are not equal, the electric field vector 16 becomes that designated by reference numeral 17. The electric field vectors 15 and 16 are neutralized, and the electric field vectors 15 and 17 are combined to be the resultant electric field vector 18. The resultant electric field vector 18 is detected by the photo sensing device 6.

Let us then consider a case where information is recorded in the recording medium in terms of a variation of refractive index. In this case, the refractive index difference causes a phase difference between the probe light beams. In the vector diagram shown in FIG. 3(b), an electric field vector 15 is that of the first probe light beam. When the refractive index at the light spot 7a is equal to that of the light spot 7b, the second probe light beam has an electric field vector 16. When the refractive indices are not equal, the second probe light beam has an electric field vector 17. The electric field vectors 15 and 16 are neutralized, and the electric field vectors 15 and 17 are combined to be the resultant vector 18. The resultant electric field vector 18 is detected by the photo sensing device 6.

Let us then consider a recording medium, e.g., a photomagnetic disk, in which information is recorded by using polarized light. It is assumed that two probe light beams going to the light spots 7a and 7b are both Y-polarized. Before reaching the light spots 7a and 7b, the first and second probe light beams have electric field vectors 13 and 14, respectively, as shown in FIG. 4. If the optical rotary powers at the spots 7a and 7b are equal to each other (in the case of the magnetic disk, the magnetization directions are equal to each other), the first and second probe light beams have electric field vectors 15 and 16, respectively. Accordingly, the resultant vector of the electric field vectors 16 and 15 is zero. When the optical rotary powers at the light spots 7a and 7b are different from each other, the second probe light beam has an electric field vector 17. That is, the difference between the polarization directions is detected as in the case of FIGS. 3(a) and 3(b).

The information recorded in another recording layer not under access affects the two laser beams (probe light beams). The optical information reproducing apparatus thus far described is capable of removing the influences by the information recorded in another recording layer.

In FIG. 5(a), reference numeral 22a designates a recording layer being addressed or under access, and numeral 22b designates another recording layer located above the recording layer 22a. The energy distributions of two probe light beams landing on the under-access recording layer 22a are illustrated in FIG. 5(c). The energy distributions of two probe light beams landing on the recording layer 22b located above the recording layer 22a are illustrated in FIG. 5(b). On the recording layer 22a, the two probe light beams are distributed concentrically and separately within a narrow range, as shown in FIG. 5(c). On the recording layer 22b, as shown in FIG. 5(b), the energy distributions of the two probe light beams are extend over a wide range, while the greater portions of them overlap with each other. The influences of the recorded contents, i.e., the distribution of transmittance, refractive index or optical rotary power, of the overlapping portion, which affect to the two probe light beams, are substantially equal to each other. Accordingly, the influences are neutralized, and little detected.

Figure 6:
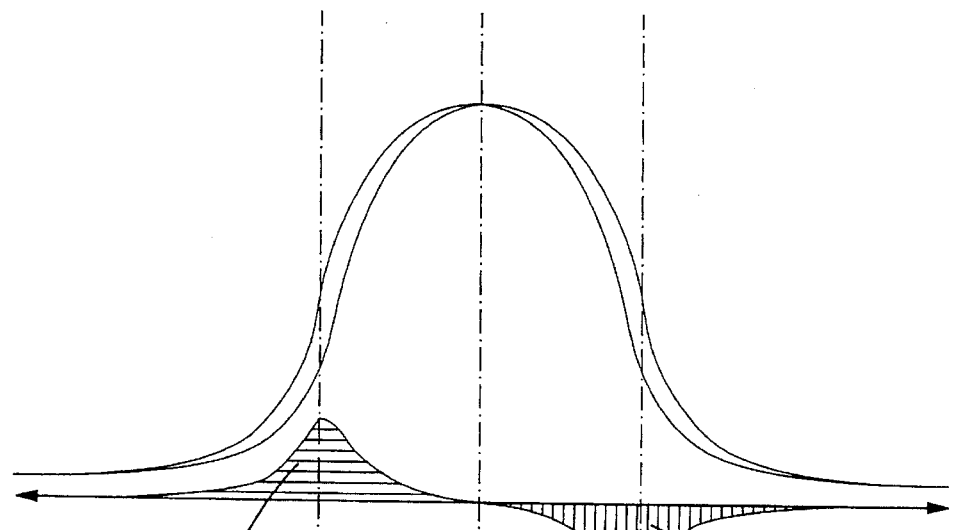
FIGS. 6(a) and 6(b) are diagrams showing a relationship of the energy distributions of two probe light differences in the recording layer above the recording layer under access.
Figure 6:
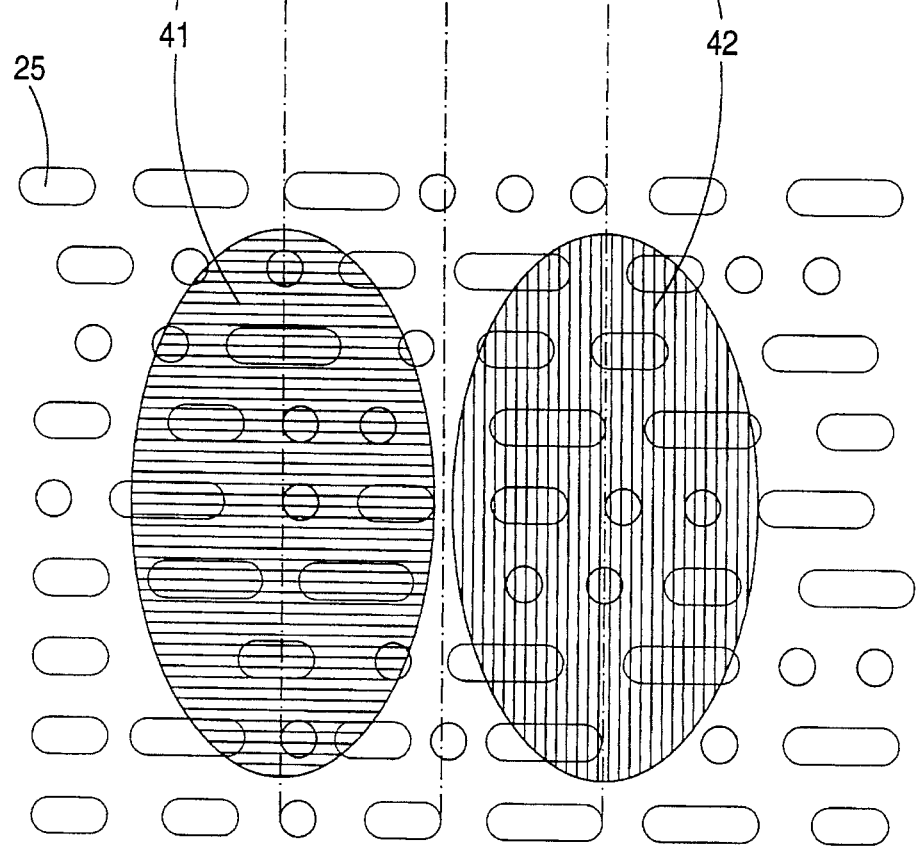

The differences of the probe light beams, designated by reference numerals 41 and 42 in FIG. 5(b), are influenced by the recorded contents of the recording layer 22b. This results in noise. This relationship is illustrated in FIGS. 6(a) and 6(b). FIG. 6(a) corresponds to FIG. 5(b). FIG. 6(b) is a plan view showing images of the probe light differences 41 and 42 on the recording layer 22b. A difference between the integration value of the product of the recorded contents in the area of the first difference 41 and an intensity of the difference, and the integration value of the product of the recorded contents in the area of the second difference 42 and an intensity of the difference, becomes noise. The recorded contents, as already referred to, indicate the distribution of transmittance, refractive index or optical rotary power. The noise is smaller as the distance between the laser beams (probe light beams) is narrower (the distance between the recording layers is wider). This results from the following two facts.

The first fact is that the ratio of the energy of the difference 41 or 42 to the energy of the original probe light beam is reduced. The second fact is that the integration value of the recorded contents becomes approximate to the statistical mean value as the area of the difference 41 or 42 is wider. That is, a statistical fluctuation of the integration value decreases and the noise reduces as the area of the difference is wider.

Figure 7:
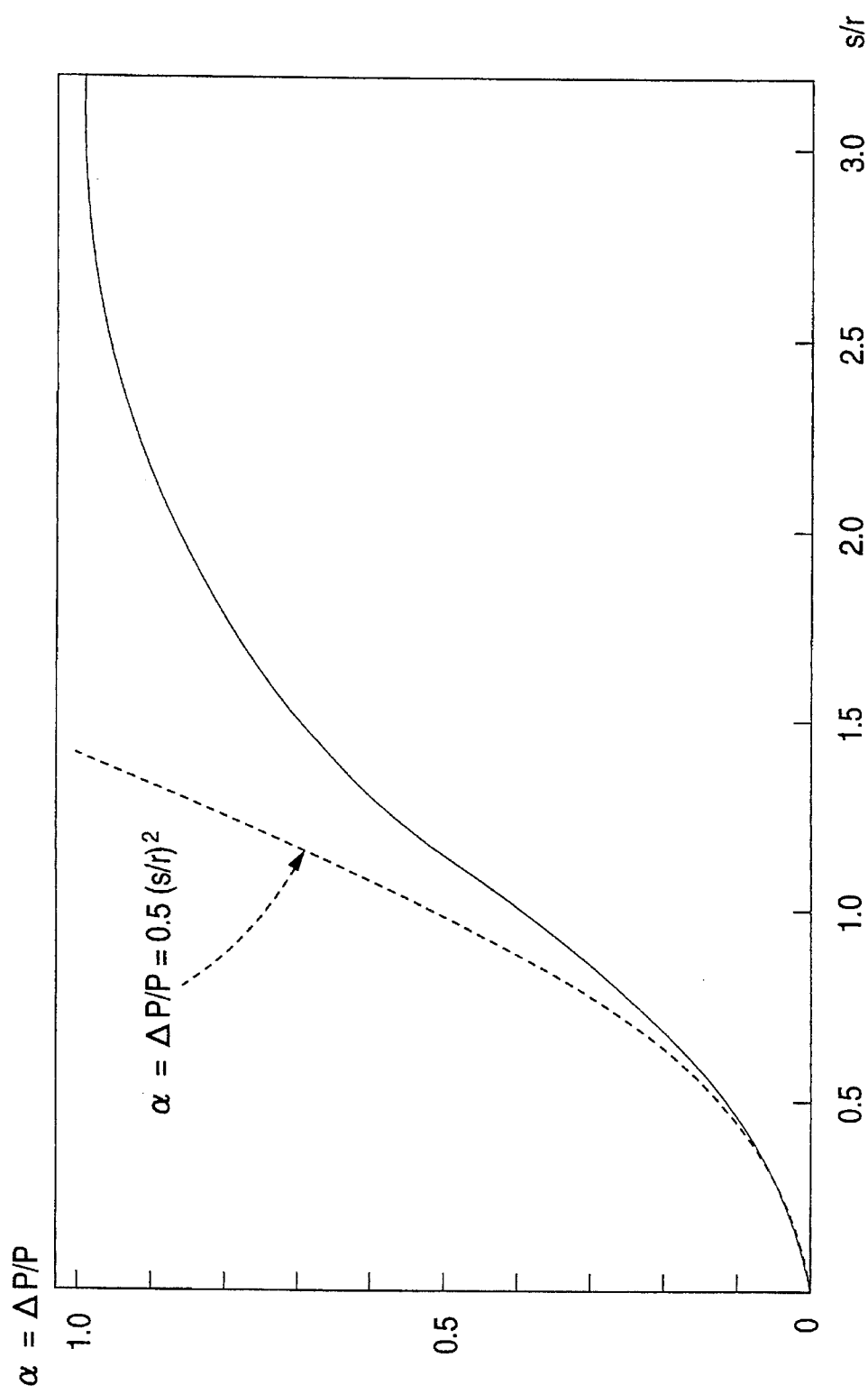
FIG. 7 is a graphical representation of a variation of ΔP/P (sum of the difference powers/sum of the original powers) with respect to s/r (distance between the centers of two probe light beams/radius of the Gaussian beam)

The statistical description of the first fact will be given. As known, the amplitude of the probe light beam (Gaussian distribution) is given by the following equation $$A(x, y) = I_o \exp(-x^2/r - y^2/r) \quad (1)$$

where r indicates the radius of the Gaussian beam (where the amplitude is (1/e) of that at the center), and $I_0$ indicates the amplitude at the center of the Gaussian beam. The sum ΔP of the powers of the differences 41 and 42 of the probe light beams shown in FIGS. 5(a) to 5(c) and 6(a) and 6(b) is given by the following equation $$\Delta P = \int\int_{-\infty}^{\infty} \{A(x, y) - A(x - s, y)\}^2 \, dxdy \quad (2)$$

where s indicates the distance of the centers of the two probe light beams. The result of numerically calculating a variation of the ratio α(=ΔP/P) of the power sum ΔP to the sum of the powers P of the two original probe light beams is graphically shown in FIG. 7. The power sum ratio α also indicates a noise suppression ratio describing a degree of suppressing the noise caused by the recording contents of the upper layer in the optical information reproducing apparatus of the invention when comparing with that in the conventional one using only one probe light beam. In the graph of FIG. 7, the abscissa represents s/r and the ordinate represents $\alpha=\Delta P/P$. In a region where s/r is satisfactorily small, a curve representative of a variation of $\alpha=\Delta P/P$ may be approximated by the following expression $$\alpha=\Delta P/P=0.5(s/r)^2 \qquad (3)$$

$\Delta P$ indicates a maximum value of theoretical noise. In such an extreme case where the region of the difference 41 is filled with record pits, while the region of the difference 42 is empty or filled with no record pit, the noise is represented by $\Delta P$. To estimate an average quantity of generated noise, the statistical discussion will be given on the assumption that a probability of record pit occurrence is 0.5 (where "1" and "0" occur at the probability of 50%, respectively).

It is assumed that the first difference 41 can accommodate an N number of record pits. The second difference 42 can also accommodate the same number of record pits since it is symmetrical with the first difference 41. A probability that an x number ($x \leq N$) of record pits occurs in the first difference 41 may be defined by the so-called binomial distribution: ${}_nC_x p^x p^{(n-x)} = {}_nC_n 0.5^x 0.5^{(n-x)}$ where p is the occurrence probability of the record pits, and p=0.5 in this instance. A probability that an Z number ($y \leq N$) of record pits occurs in the second difference 42 may be defined by the binomial distribution: ${}_nC_y 0.5^y 0.5^{(n-y)}$. It is assumed that when the differences 41 and 42 accommodate the x number of record pits and the y number of record pits, the difference $\omega xy$ of the power between the differences 41 and 42 is given by the following equation.

$$\omega_{xy}=|x/n-y/n|\Delta p \qquad (4)$$

The assumption is made where the influence by the Gaussian distribution is neglected.

Accordingly, an expected value W of the difference $\omega xy$ of the power between the differences 41 and 42 is expressed by the following equation.

$$\begin{aligned} W &= \sum_{x=0}^{n} \sum_{y=0}^{n} \omega xy \\ &= \sum_{x=0}^{n} \sum_{y=0}^{n} {}_nC_x 0.5^x 0.5^{(n-x)} \cdot {}_nC_y 0.5^y 0.5^{(n-y)} \cdot \\ &\quad |x/n - y/n| \cdot \Delta P \\ &= \beta \Delta P \end{aligned} \qquad (5)$$

In the equation (5), $\beta$ indicates the ratio of W to $\Delta P$, viz., the ratio of noise power generated from the theoretical noise by a statistical fluctuation. The result of the numerical calculation of $\beta=W/\Delta P$ is graphically shown in FIG. 8. In the graph, the abscissa represents the maximum number N of record pits that can be accommodated (logarithmically expressed), and the ordinate represents $\beta$ (logarithmically expressed). As seen from the graph, log$\beta$ linearly varies with respect to logN.

The discussion thus far made concerns the influence by the recording layer just above the recording layer under access. The influence by the recording layer above the discussed recording layer and that by the recording layer below the recording layer under access must be taken into consideration, additionally. Within the region where the equation (3) holds, the maximum value of the influence by another upper recording layer can be estimated. Assuming that the recording layers are formed at fixed intervals, the radius of the probe light beam on the recording layer located by two layers above the recording layer under access is two times as large as that of the recording layer above the under-access recording layer. The probe light beams are spaced at the same intervals. The noise generated in the respective recording layers are denoted as $W_1, W_2, W_3, \ldots, W_i, \ldots$ in the ascending order from the recording layer just above the under-access recording layer. The energy $\Delta Ei$ of the probe light difference of the i-th recording layer with respect to the under-access recording layer is given by the following equation.

$$\Delta Ei=W_1(1/i)^2=W(1/i)^2 \qquad (6)$$

Since the difference powers caused by the recording layers have no relation to one another, these are handled as the adding operation of the noise power. In other words, the square root 6 of the square sum of the difference energies $\Delta Ei$ works in net.

$$\delta=\{2\times(W_1^2+W_2^2+W_3^2+\ldots+W_i^{1\circ}\ldots)\}^{\frac{1}{2}}$$

Then, we have the sum of the influences by the recording layers as follows:

$$\begin{aligned} \delta &= \left\{ 2 \sum_{i=1}^{n} (W_i)^2 \right\}^{1/2} = \left\{ 2 \sum_{i=1}^{n} W_i (1/i)^2 \right\}^{1/2} \\ &\leq \left\{ 2W_1 \sum_{i=1}^{\infty} (1/i)^4 \right\}^{1/2} = W_1 \cdot \{(\pi^4/45)\}^{1/2} \\ &\approx 1.47\alpha\beta P \end{aligned} \qquad (7)$$

The worst value $(S/N)_{min}$ of the signal-to-noise ratio (S/N) about the noise caused by other recording layers than the under-access recording layer is given by the following equation.

$$(S/N)_{min}=P/\delta=P/(1.47\alpha\beta P)=1/(1.47\alpha\beta) \qquad (8)$$

<Design 1>

Figure 8:
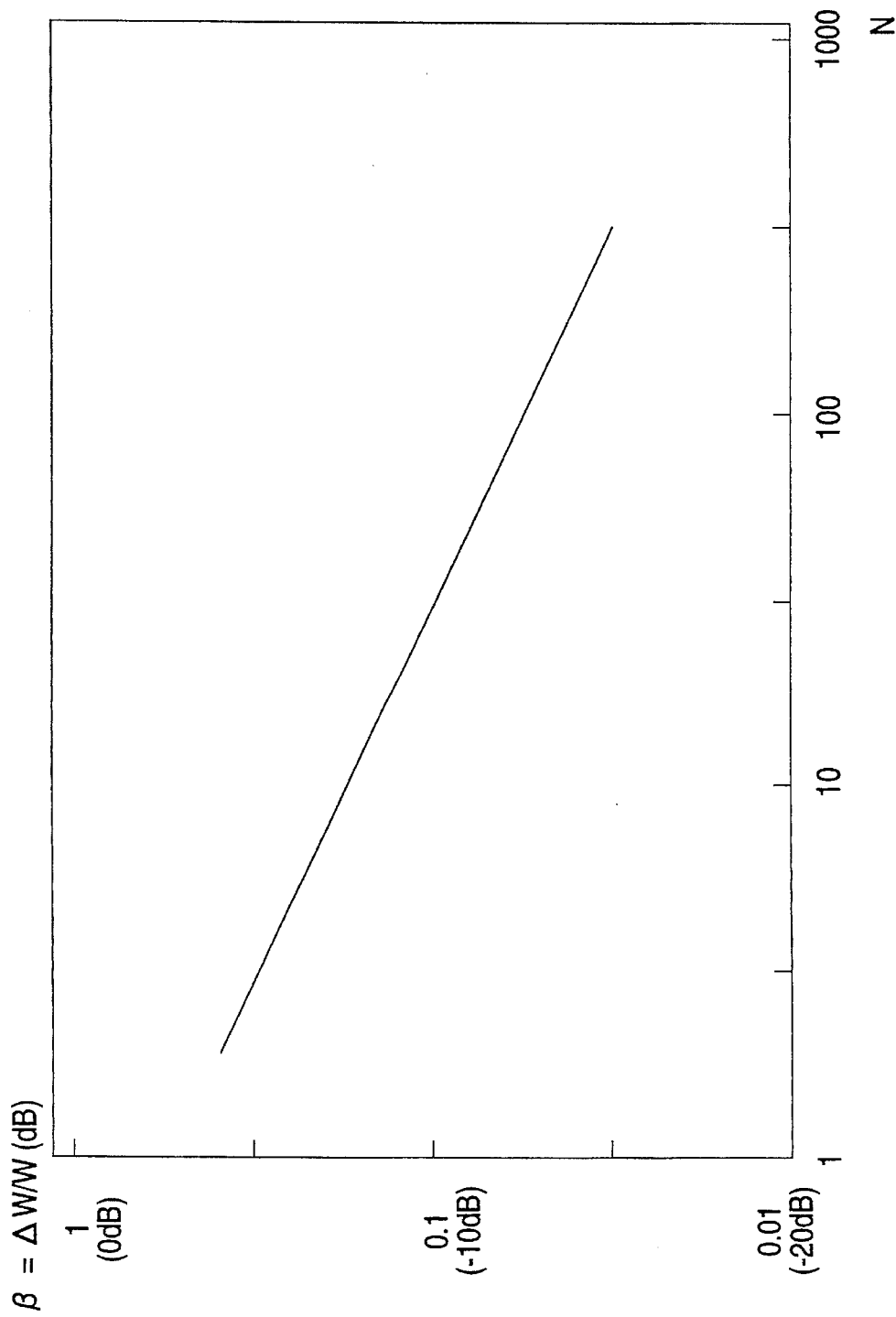
FIG. 8 is a graph showing a variation of ΔW/ΔP (expected value of the power difference/sum of the difference powers) with respect to N (maximum number of record pits)

Specific numerical values were: NA (numerical aperture of the image forming optical system)=0.5 (corresponding to 1.0 of F number), d (spot diameter) =1.0 µm, s (spot-to-spot (probe light) distance)=3 µm, and L (layer-to-layer distance) =20 µm. On the recording layer 22b the two probe light beams are each spread to have a diameter of approximately 20 µm (r (radius)=10 µm), but the center-to-center distance s of the light spots is 3 µm (s=3 µm), left unchanged. Accordingly, s/r=3/10=0.3. Then, the graph of FIG. 7 or the equation (3) gives $\alpha \approx 0.045$. This figure implies that the optical information reproducing apparatus of the invention, which uses two probe light beams, can suppress the noise caused by the recorded contents of the upper recording layer to a value approximately 0.045 times as large as a value of noise suppressed by the conventional one. A maximum of 200 record pits can be contained in the difference 41 or 42 on the recording layer 22b just above the under-access recording layer. In this instance of the embodiment, it is assumed that 400 number of spots of 1 µm in diameter are contained in the spot of 20 µm in diameter, and the half of 400 spots are contained in the difference 41 or 42. Since N=200, the graph of FIG. 8 gives $\beta=0.04$ (−14 dB). Accordingly, the equation (8) gives $(S/N)_{min}=27.4$ dB. In the conventional apparatus using only one probe light beam, $(S/N)_{min}$ is only about 14 dB.

As the numerical aperture NA is larger, the distance between the recording layers is larger, and the spot-to-spot distance p is smaller, the area ratio of a portion where the laser beams (probe light) overlap to a portion where the laser beams do not overlap can be increased. An extreme increase of the numerical aperture NA is not allowed, but the layer-to-layer distance can be increased to some degree. The lower limit of reducing the spot-to-spot distance is about three times as large as the spot diameter, when the optical coupler 2a is used. When the Wollaston prism is used as in the fourth embodiment of the present invention to be described later, the spot-to-spot distance may be reduced to be equal to or ½ of the spot diameter.

<Design 2>

In this design, s (spot-to-spot (probe light) distance) =1 μm and L (layer-to-layer distance)=5 μm, and other design parameters are the same as those in Design 1. Since s/r=⅕ =0.2, α≈0.02 is led from the graph of FIG. 7 or the equation (3). Since N≈10, β≈0.18 (−7.5 dB) is led from the graph of FIG. 8. It is assumed that 25 number of spots of 1 μm in diameter are contained in the spot of 5 μm in diameter. Accordingly, $(S/N)_{min}$=22.8 dB is obtained by calculating the equation (8). In the conventional apparatus using only one probe light beam, the S/N is reduced by approximately 13 dB, and $(S/N)_{min}$ is at most 9 dB.

To realize the bit error rate of $10^{-10}$, about 20 dB suffices for the S/N. Accordingly, when s (spot-to-spot (probe light) distance)=1 μm, the layer-to-layer distance may be reduced to about 5 μm.

Such an approach that the layer-to-layer distance is reduced to below 5 μm, and that the error correction technique, such as the known Viterbi decoding method, is applied to the electrical signals reproduced by the construction of FIG. 1, is allowed. Where the layer-to-layer distance is reduced, noise is increased and the error rate is increased. However, a desired error rate can be obtained by using the error correction technique. In the Viterbi decoding method, the coding gain, i.e., the quantity obtained by converting the error rate improvement to the S/N improvement, is 6 to 8 dB. Therefore, it is expected that if the layer-to-layer distance is set at about 2 μm, a satisfactorily small error rate can be secured.

The above-mentioned technique for removing the in-phase noise is based on the condition that the amplitudes and the phases of the two laser beams (probe light beams) are slightly different. In other words, a shallow modulation of the recording layer is essential. When the laser beam (probe light) is focused at the record pit of 100% amplitude-modulated, for example, the laser beam (probe light) is not detected, so that the in-phase noise cannot be removed. The same thing takes place also when the record pit is phase modulated so deep that the phase is shifted by π(180°). Where half of the record pits of the recording layer not being addressed are the π phase-shifted record pits, while the remaining record pits are 0 phase-shifted record pits, there is a case where the probe light disappears.

Figure 9:
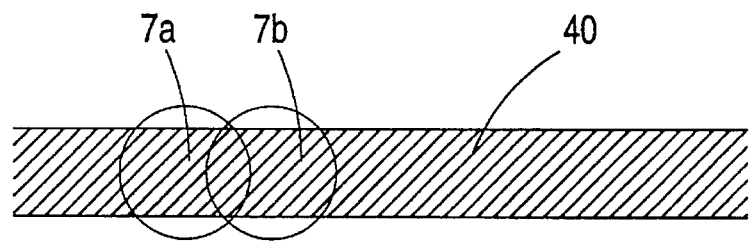
FIGS. 9(a) to 9(c) are diagrams showing allocations of two light spots on recording tracks.
Figure 9:
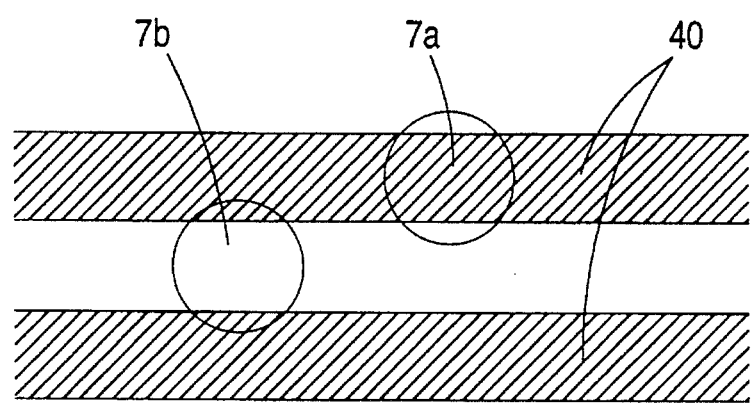
Figure 9:
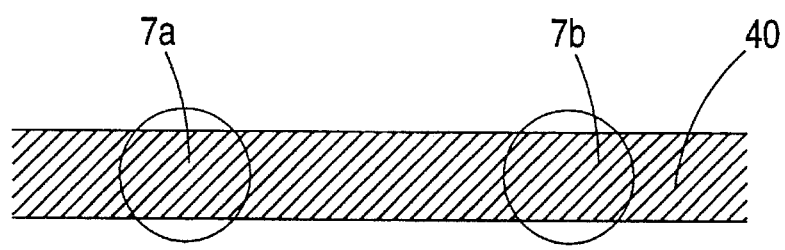

Examples of allocations of light spots 7a and 7b on recording tracks are illustrated in FIGS. 9(a) to 9(c). In FIG. 9(a), the light spots 7a and 7b, closely disposed, are allocated on one recording track 40. In FIG. 9(b), the light spot 7a is disposed on the recording track 40, and the light spot 7b is disposed at another portion, not the recording track 40. In the portion between the recording tracks 40, the same physical condition continues. Therefore, this portion can be used for detecting the recorded contents. If a proper coding method of recording information is used, the light spots 7a and 7b may be disposed at different locations relatively spaced on the recording track 40 (FIG. 9(c)).

Figure 10:
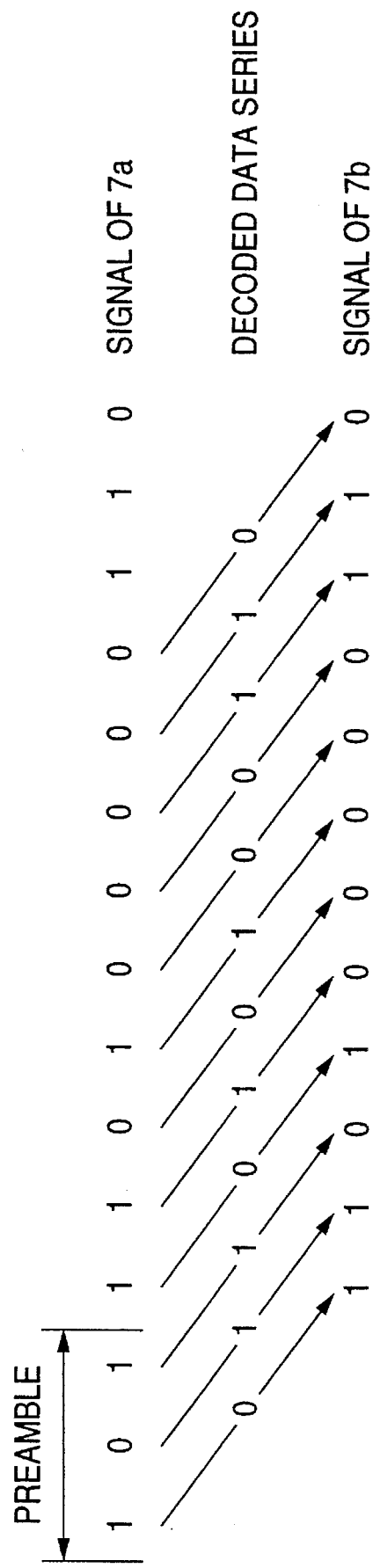
FIG. 10 is a diagram showing a decoding method in the spot allocation shown in FIG. 9(c)
Figure 11:
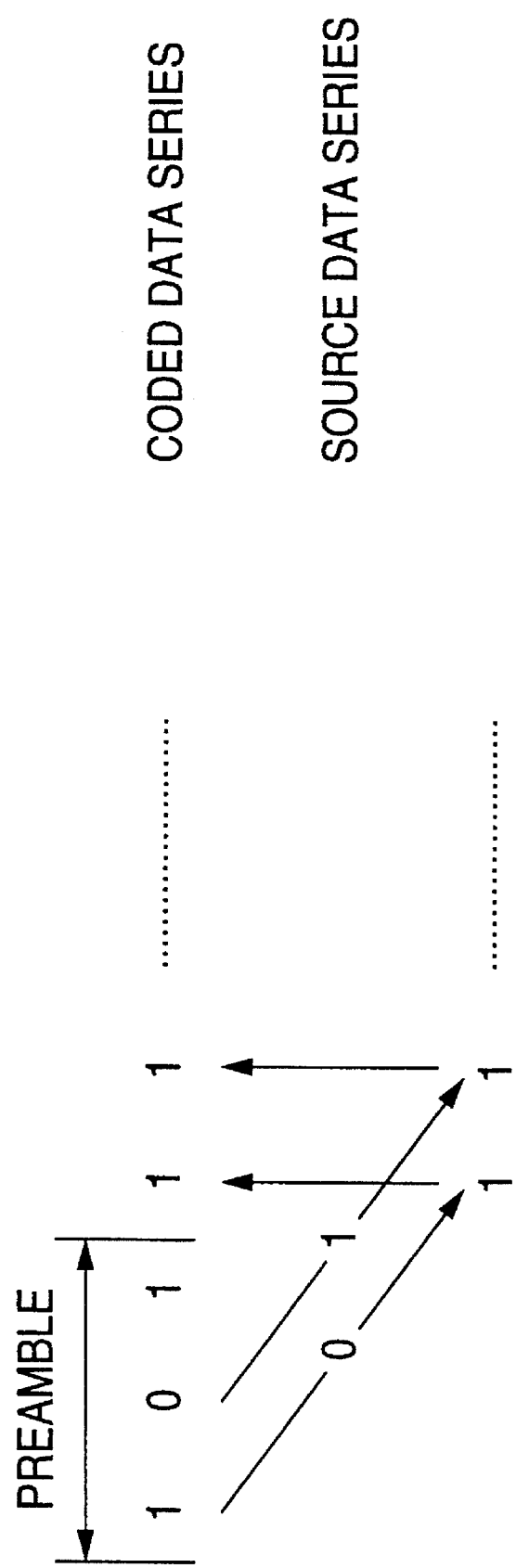
FIG. 11 is a diagram showing a coding method in the spot allocation shown in FIG. 9(c)

When the light spots 7a and 7b are disposed as shown in FIG. 9(c), the autocorrelation of the serial data is detected as shown in FIG. 10. Accordingly, in this case, the coding as shown in FIG. 11 is used. In this coding, codes resulting from the source data series is chained to a fixed preamble.

Figure 12A:
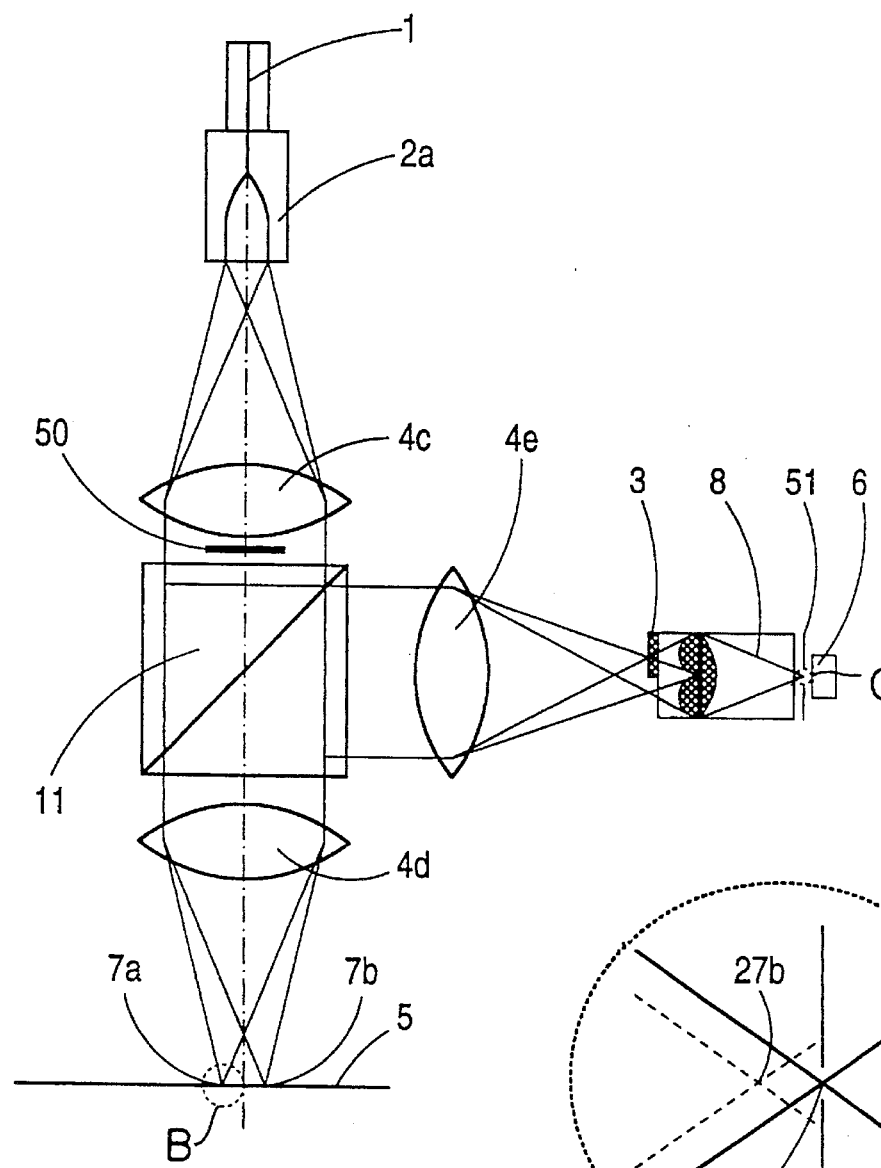
FIG. 12A is a view developed in a plane including an optical axis of the optical system of a second embodiment of the optical information reproducing apparatus according to the present invention.
Figure 12C:
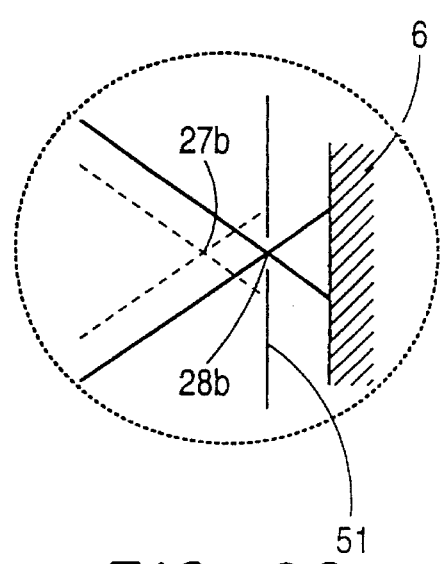
FIG. 12C is an expanded view of the area labeled C in FIG. 12A.
Figure 12B:
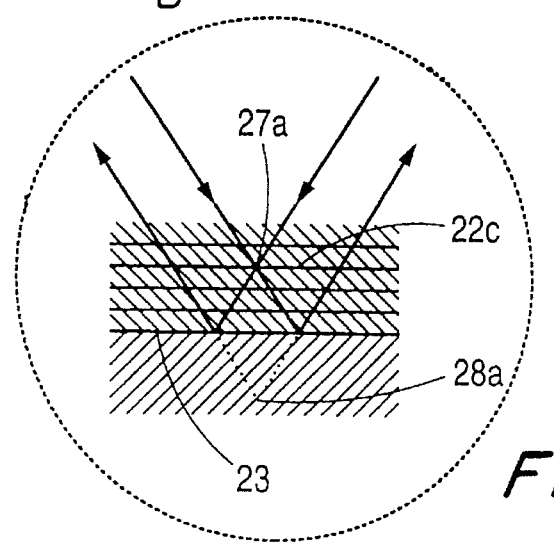
FIG. 12B is an expanded view of the area labelled B in FIG. 12A.

FIG. 12A–12C show a second embodiment of the present invention. In the figures, like reference numerals are used for designating like portions in the first embodiment. The same thing is true for the remaining embodiments to be described later. The second embodiment is different from the first embodiment mainly in the following four points. 1) The layout of the pseudo-reflection type optics is employed. 2) The phase shifter 3 is located in the light receiving unit. 3) An aggregative microlens multiplexer 8 is used for the multiplexing means in the light receiving unit, in place of the waveguide optical coupler 2b. 4) An optical stop 50 is provided to obtain a super-resolution.

In the layout of the pseudo-reflection type, the optical system is laid out as in the layout of the reflection type, but data is read out of the recording layer in a readout manner of the transmission type. It is for this reason that the term "pseudo-reflection type" is used. The laser beam is focused at a point 27a, transmitted through a recording layer 22c, reflected by a reflecting layer 23, and directed by a half-mirror 11 toward the light receiving unit. When viewed from the light receiving unit, the record pit is equivalently present at a point 28a. Two laser beams projected into the light receiving unit are phase shifted by the phase shifter 3, multiplexed by the aggregative microlens multiplexer 8, and then led to the photo sensing device 6. The second embodiment thus constructed can attain the effects comparable with those of the first embodiment. In the optical information reproducing apparatus of the second embodiment, recorded information can be read out of the recording medium from one side of the recording medium. Therefore, the construction of the optical head is simpler than that of the transmission type in which the optical systems must be provided on both sides of the recording medium. Use of the aggregative microlens multiplexer 8 provides a higher light condensing efficiency.

The optical stop 50 shuts off the central part of the laser beam. As a result, the spot diameter of the laser beam can be reduced. An aperture 51 is used for removing the sidelobe caused by the super-resolution. The technique of the super-resolution to reduce the spot diameter by shutting off the central part of the laser beam is known (Reference is made to "Possibility of the Super-resolution in an Optical Pick-up Head" by Suhara and Nishihara, Optics Vol. 21, No. 7, pp. 442 to 450 (1992).).

In the second embodiment, the transmitted light from the recording layer 22c is reflected by the reflecting layer 23 and then detected. Accordingly, the light reflected by the recording layer 22c becomes noise. The reflected light by the recording layer 22c is focused at a point prior to the photo sensing device 6. A position 27b where the reflected light is focused is different from a position 28b where the transmitted light, is focused. Therefore, the influence by the reflected light can be reduced by the aperture 51.

Figure 13:
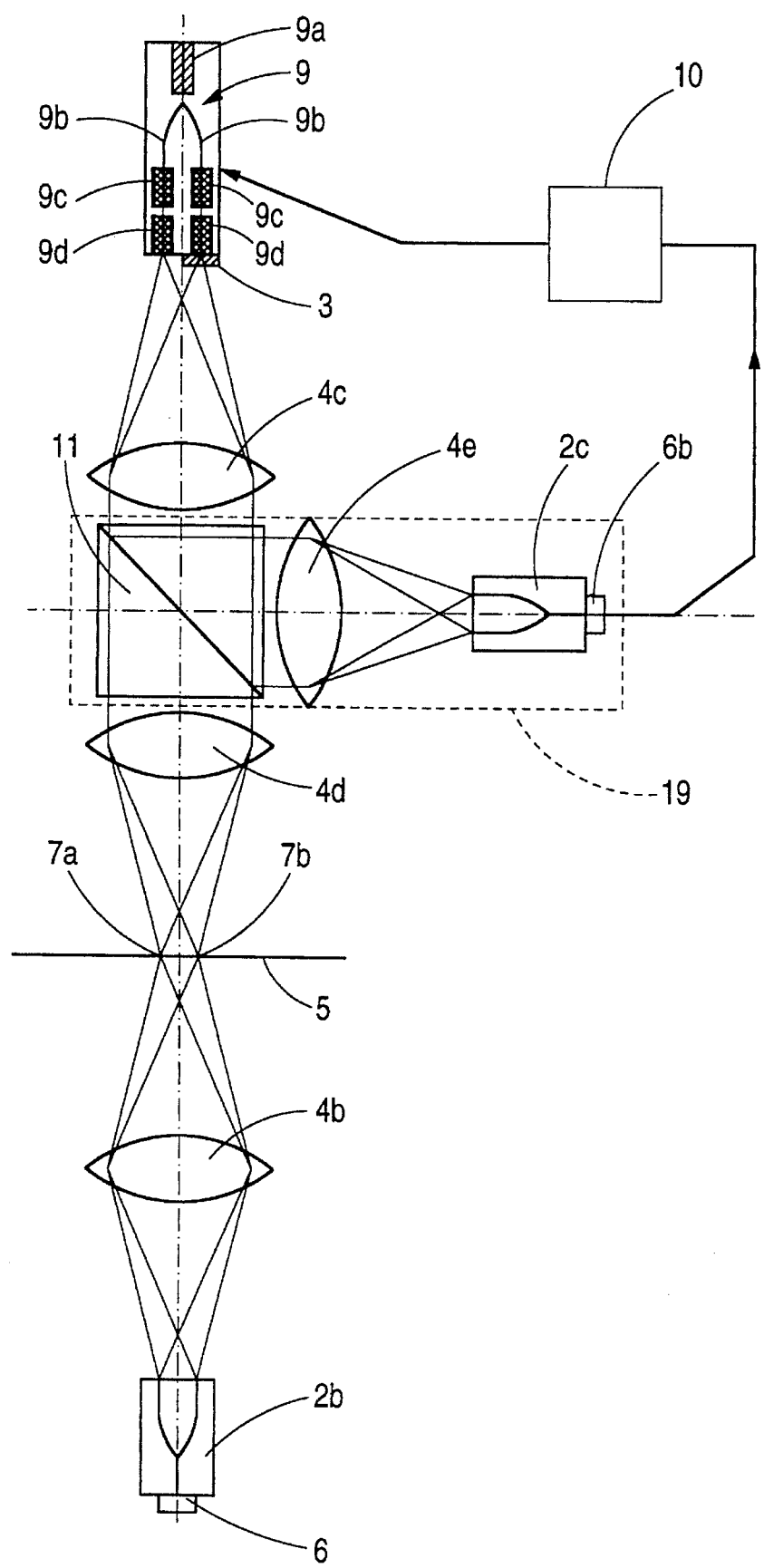
FIG. 13 is a view developed in a plane including an optical axis of the optical system of a third embodiment of the optical information reproducing apparatus according to the present invention.
Figure 14A:
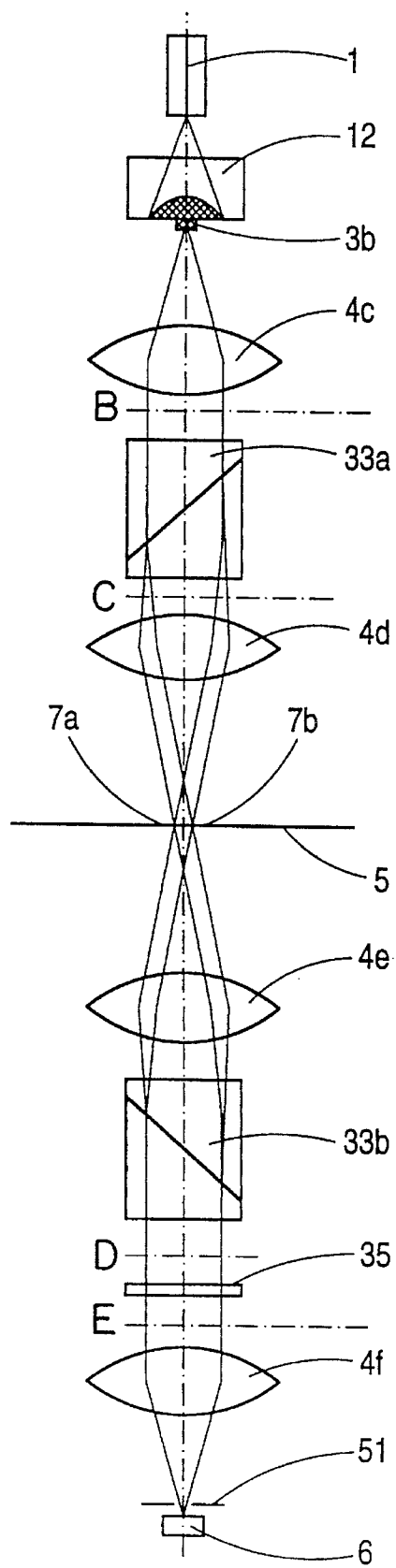
FIG. 14A is a view developed in a plane including an optical axis of the optical system of a fourth embodiment of the optical information reproducing apparatus according to the present invention.
Figure 14B:
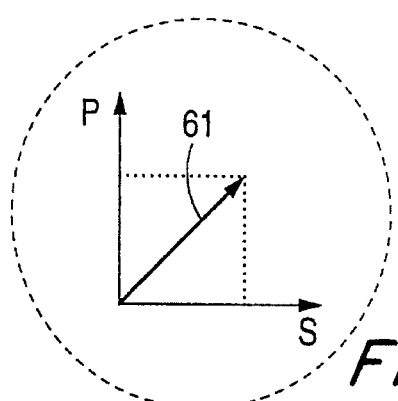
FIG. 14B shows the polarized states of the laser beams at position B of FIG. 14A.
Figure 14C:
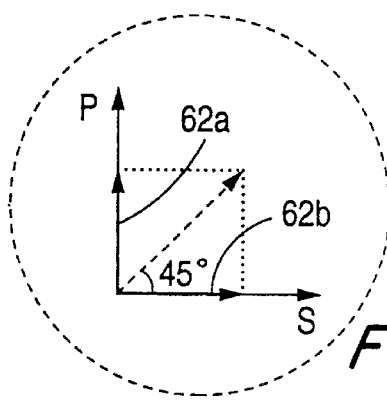
FIG. 14C shows the polarized states of the laser beams at position C of FIG. 14A.
Figure 14D:
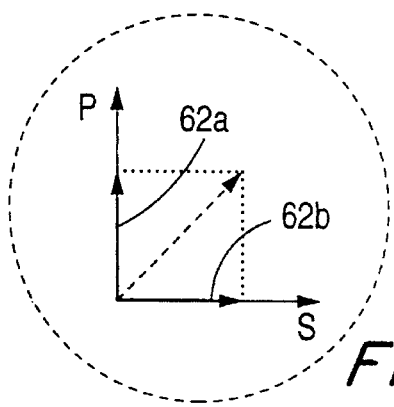
FIG. 14D shows the polarized states of the laser beams at position D of FIG. 14A.
Figure 14E:
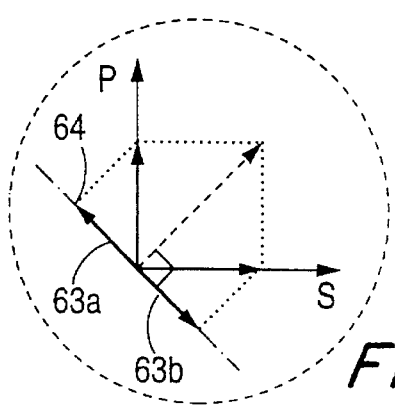
FIG. 14E shows the polarized states of the laser beams at position E of FIG. 14A.

FIG. 13 shows a third embodiment of the present invention. In the present invention, the phase difference and the amplitude difference of the two laser beams are detected. In this respect, it is essential to exactly control the phases and amplitudes. To this end, a system to automatically control the phase and amplitude differences of the two laser beams is employed in the third embodiment.

In this embodiment, an optical integrated circuit 9 is used in place of the semiconductor laser 1 and the optical coupler 2a in the first embodiment. The optical integrated circuit 9 includes an integration of a semiconductor laser 9a of the DFB (distributed feedback) type, a semiconductor optical waveguide 9b, an optical amplifier 9c, and a variable phase shifter 9d. Further, a zero-adjust optical difference detector 19 is used. Two laser beams from the optical integrated circuit 9 are applied to the zero-adjust optical difference detector 19 which detects the phase and amplitude differences of those laser beams before they pass through the multi-layer recording medium 5.

The zero-adjust optical difference detector 19 is made up of a half-mirror 11, a lens 4e, a waveguide optical coupler 2c, and a photo sensing device 6b. The construction of the difference detector 19 is substantially the same as that of the optical difference detector for signal reproduction. The two laser beams from the optical integrated circuit 9 are split by the half-mirror 11 before the multi-layer recording medium 5, multiplexed by the waveguide optical coupler 2c, and led to the photo sensing device 6b. If the amplitudes of the two laser beams are equal to each other and the phase difference of them are exactly 180°, the output signal of the photo sensing device 6b is zero. If the output signal of the photo sensing device 6b is not zero, the amplitudes or the phases are different from each other. In this case, a controller 10 changes electrical signals in accordance with the difference of the amplitudes or the phases, and applies the changed electrical signals to the optical amplifier 9c and the variable phase shifter 9d, thereby controlling the phases and the amplitudes thereof. As a result, the phase difference of the two laser beams is set at 180° and the amplitudes thereof are set to be equal to each other.

Both the phases and the amplitudes of the laser beams must be controlled by a single output signal of the photo sensing device 6b. Some technique must be used to realize this.. A time divisional control method is one of the approaches. For a fixed period of time, the amplitudes alone are controlled. In the control, the drive current of the optical amplifier 9c is controlled so as to minimize the output signal of the photo sensing device 6b. For the subsequent fixed period of time, only the phases are controlled. In the control, the drive current of the variable phase shifter 9d is controlled so as to minimize the output signal of the photo sensing device 6b. During the control of the drive current of the optical amplifier 9c, the drive current of the variable phase shifter 9d is sustained. During the control of the drive current of the variable phase shifter 9d, the drive current of the optical amplifier 9c is sustained. The zero adjustment is automatically carried out through the alternate control of the amplitude and phase.

In the construction of FIG. 13, the phase-locked laser device, coupled in an opposite-phase mode, may be used in place of the optical integrated circuit 9. In this case, the amplitudes of the two laser beams are balanced by controlling the injection currents to the two semiconductor lasers coupled in an opposite-phase mode by the output signal of the photo sensing device 6b. The phase control is not allowed in the construction using the phase-locked laser device. However, the manufacturing of the phase-locked laser device is easier than that of the optical integrated circuit 9.

FIGS. 14A–14E shows a fourth embodiment of the present invention. The fourth embodiment is based on the phase-shift super-resolution. A laser beam emitted from a semiconductor laser 1 is collimated by a collimator lens 12. The phase of the central component of the laser beam is shifted by 180° from that of the peripheral component thereof by means of a phase shifter 3b. The combination of a lens 4c, a Wollaston prism 33a, and a lens 4d forms two light spots 7a and 7b on the recording medium 5. Since the planes of polarization of the light spots 7a and 7b are orthogonal to each other, these spots do not interfere with each other on the recording medium 5. The combination of a lens 4e, a Wollaston prism 33b, a polarizer 35, and a lens 4f multiplexes the two laser beams and the multiplexed beam reaches the photo sensing device 6 through an aperture 51. In FIGS. 14B–14E, polarized states of the laser beams at the key portions are also illustrated.

The laser beam 61 from the semiconductor laser 1 is linearly polarized, and optically disposed such that its polarization plane is inclined by 45° with respect to the optical axis of the Wollaston prism 33a. The laser beam 61 enters the Wollaston prism 33a which in turn splits the laser beam into two laser beams 62a and 62b of which the polarization planes are orthogonal to each other. The laser beams 62a and 62b, when emitted from the Wollaston prism 33a, are parallel but slightly inclined. By the lens 4d, those two laser beams 62a and 62b are image-formed as light spots 7a and 7b on the multi-layer recording medium 5. The two laser beams pass through the multi-layer recording medium 5, and enter the Wollaston prism 33b through the lens 4e. By the Wollaston prism 33b, the two laser beams are multiplexed into a flux of parallel beams. The parallel light beams are circularly polarized, having the components in the two planes of polarization orthogonal to each other. The laser beams 62a and 62b, after passing the polarizer 35, are orthogonally projected in the polarizing direction 64 of the polarizer 35. These beams are designated as 63a and 63b. The laser beams 63a and 63b lie in the same plane of polarization and are in an opposite-phase state.

Figure 15:
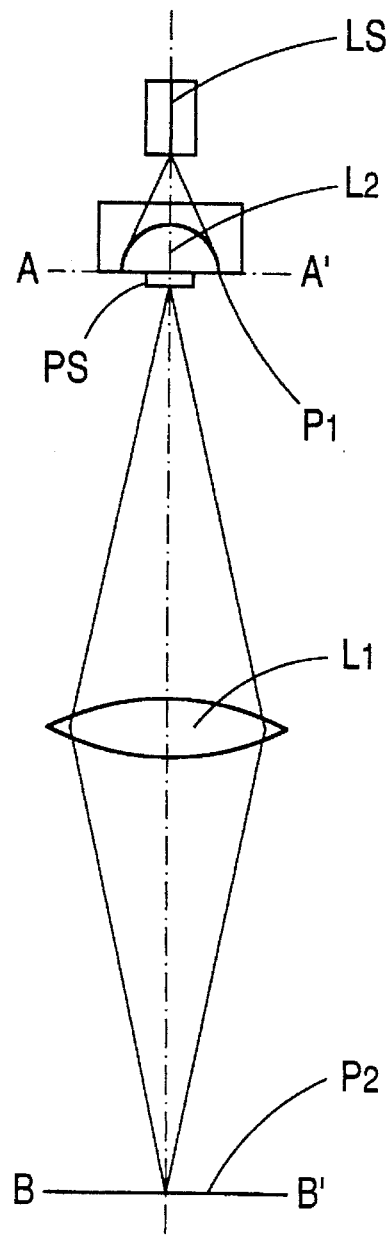
FIGS. 15(a) to 15(c) are diagrams useful in explaining the principle of a phase-shift super-resolution.
Figure 15:
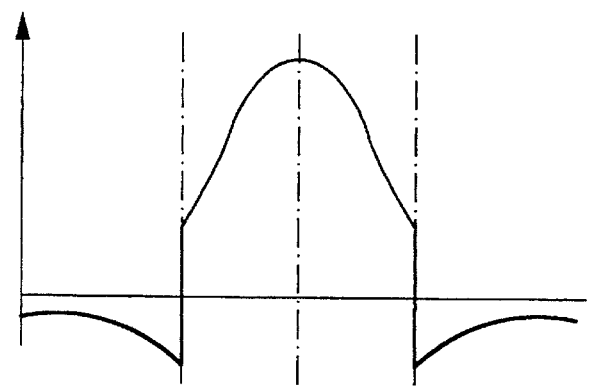
Figure 15:
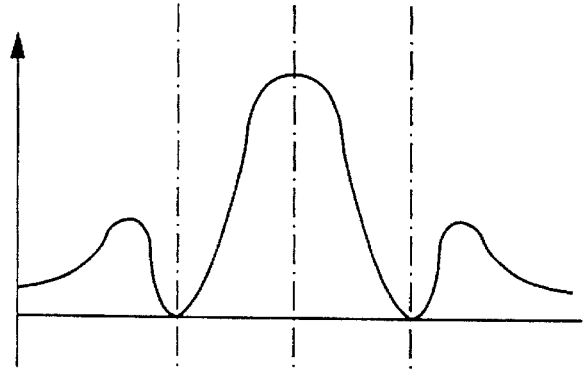

In the conventional super-resolution described in the second embodiment of the invention, the result of shutting off the central part of the laser beam by the optical stop is loss of light quantity. The phase-shift super-resolution described in U.S. patent application Ser. No. 07/941,155, is free from the loss of light quantity. This phase-shift super-resolution is a technique to reduce the spot diameter of the main peak by shifting the phase of the central part of the laser beam (Gaussian beam) from that of the circumferential part of the laser beam by 180°. The principle of the phase-shift super-resolution will be described with reference to FIGS. 15(a) to 15(c). Laser light emitted from an laser light source LS is collimated by a collimator lens L2, and the phase of the central part of the Gaussian laser beam is shifted by 180° from that of the circumferential part thereof by a phase shifter PS. A plane A—A' containing the phase shifter PS is optically conjugate with an image forming plane B—B', with respect to a principal image forming lens $L_1$. In this optical system, the amplitude of a laser light beam varies in the plane A—A', as shown in FIG. 15(b). When this laser light beam is imaged on the plane B—B', the intensity of the laser light beam is distributed as shown in FIG. 15(c). The fourth embodiment of the present invention is based on the described phase-shift super-resolution. In the technique disclosed in U.S. patent application Ser. No. 07/941,155, a great, phase inverted sidelobe appears around the main peak. When two number of such beams are set in close proximity to form an image, the two beams interfere in a complicated manner. To cope with this, this embodiment arranges the planes of polarization of the two beams at a right angle on the surface of the recording medium, thereby preventing the interference of the two beams, and rearranges the polarization planes in the same direction when the beams are multiplexed. In the embodiment, the aperture 51 is used for removing the sidelobe resulting from the super-resolution.

In this embodiment, the Wollaston prism is used for splitting and multiplexing the laser beams, but a beam displacer may be used in place of the Wollaston prism. In the latter case, the beam displacer must be located in proximity to the collimator lens 12 and the photo sensing device 6.

The present invention has been described in connection with the apparatus for reading out the information from the optical multi-layer recording medium. The invention may be embodied in the form of a three-dimensional information readout apparatus for measuring a three-dimensional distribution of transmittance, refractive index, and state of polarization of a bulky sample. A specific example of the three-dimensional information readout apparatus is an instrument for measuring a three-dimensional distribution of refractive index of optical glass. Application of the invention to an optical system using ultrasonic waves in lieu of light possibly leads to improvement of the ultrasonic microscope.

The light source used for the present invention is not limited to the semiconductor laser light source but may be any type of light source capable of emitting coherent light. Further, a wavelength converting element using the nonlinear optical effect may be used for the light source.

The construction of the optical system of each of the third and fourth embodiments is of the transmission type, but the embodiment may be constructed using the optical system of the pseudo-reflection type.

In the above-mentioned embodiments, the difference of the properties of light is optically made. In another possible method to produce the difference, two probe light beams are received by the photo sensing devices additionally provided and the difference of them is made by using electrical signals output from the photo sensing devices. This method can also prevent the cross talk among the recording layers (referred to as interlayer cross talk).

Some typical structures of the optical multi-layer recording medium, which are suitable for the readout by the optical information reproducing apparatus as described above, will be described.

Figure 16:
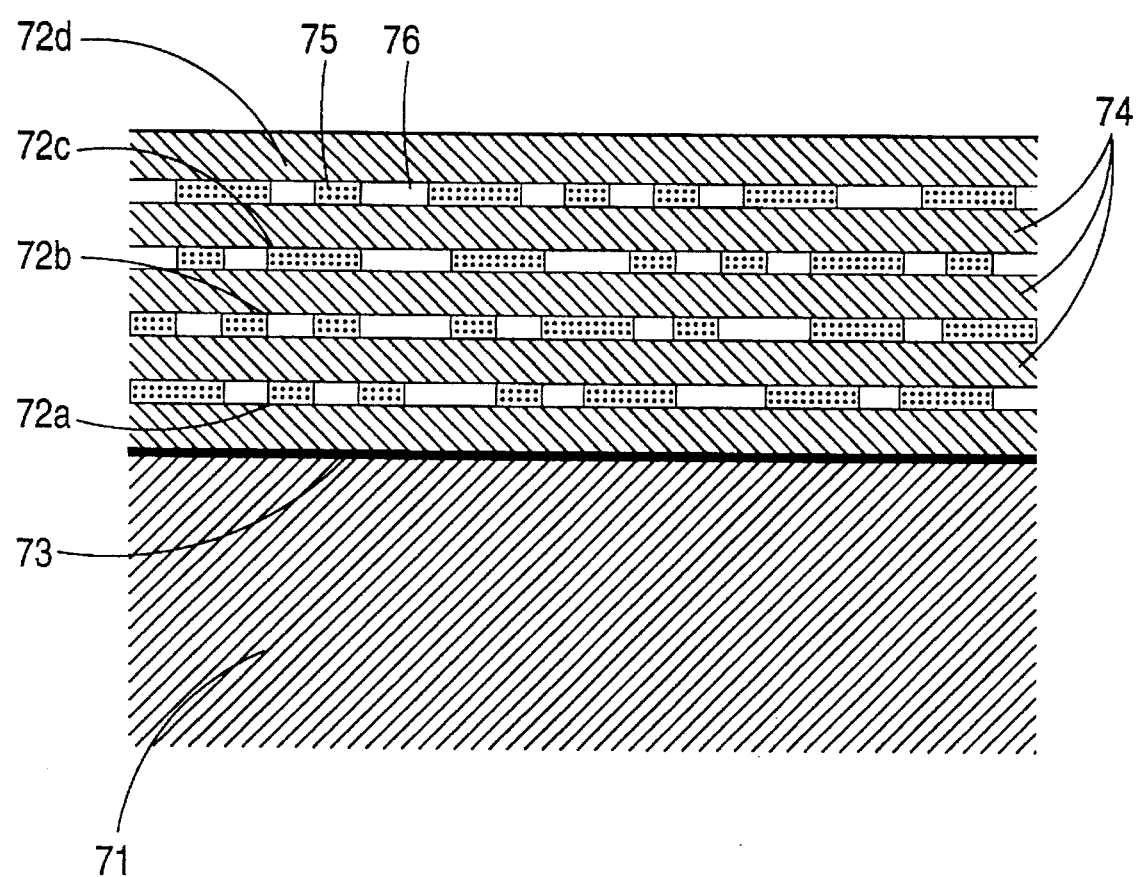
FIG. 16 is a cross sectional view showing a first structure of an optical multi-layer recording medium.

FIG. 16 is a cross sectional view showing a first structure of an optical multi-layer recording medium. As shown, recording layers 72a to 72d with information recorded therein and transparent spacers 74 are alternately layered on a reflecting surface 73 formed on a substrate 71. The recording layers 72a to 72d each consists of record pits 75 and portions 76 (nonpit portions) not serving as record pits. In the first structure of the optical multi-layer recording medium, the refractive index of the record pit 75 is different from that of the nonpit portion 76.

Figure 17:
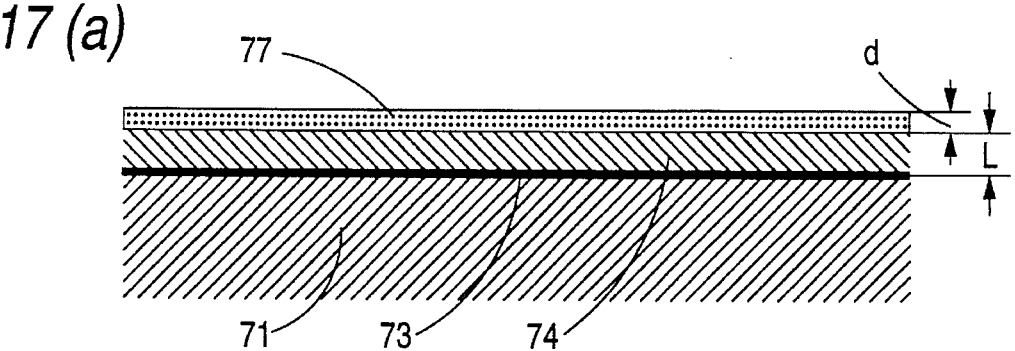
FIGS. 17(a) to 17(d) are diagrams showing a process of manufacturing the optical multi-layer recording medium of the first structure.
Figure 17:
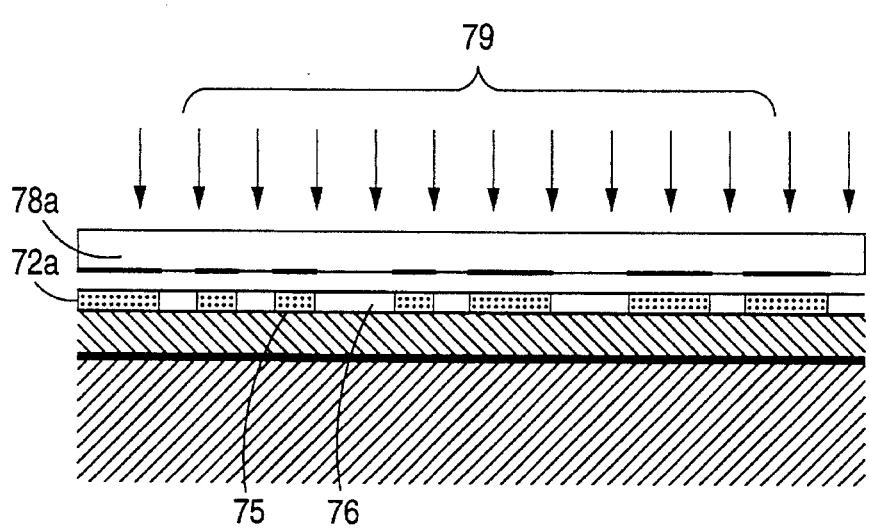
Figure 17:
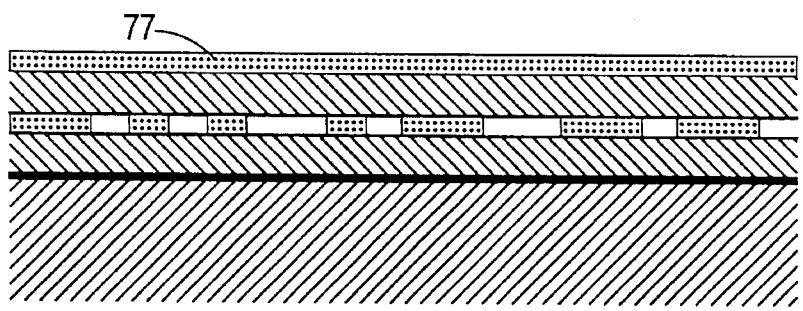
Figure 17:
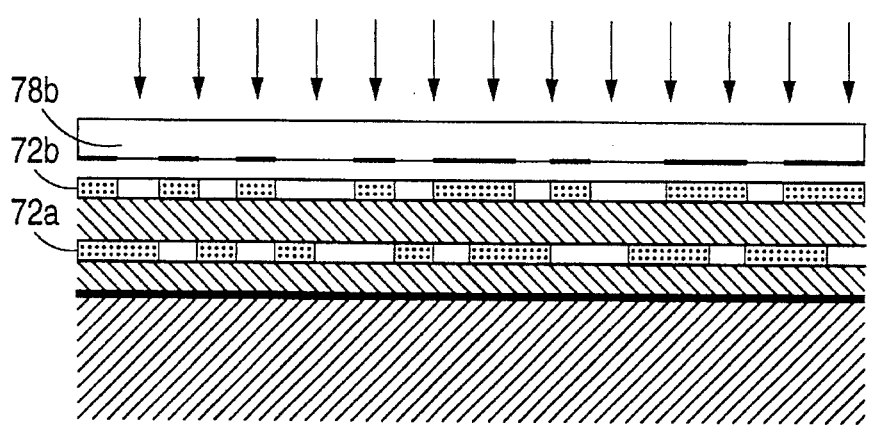

FIGS. 17(a) to 17(d) are diagrams roughly showing a process of manufacturing the optical multi-layer recording medium of the first structure shown in FIG. 16. A reflecting film 73 is formed on the substrate 71 made of glass or plastic by sputtering or vapor depositing metal, such as aluminum, on the surface thereof. A transparent spacer layer 74 is then formed on the reflecting film 73. To form the spacer layer, the surface of the reflecting film 73 is coated with ethanol soluble polyamide by a spin coating method. A polycarbonate film 77 added with methylacrylate monomer is formed on the transparent spacer layer 74 by a spin coating method. In this case, methylene chloride is used as solvent. This polycarbonate film 77 serves as a virgin recording layer. FIG. 17(a) is a sectional view showing the structure formed through the manufacturing process up to this step. The thickness L of the transparent spacer layer 74 is 10 μm, and the thickness d of the recording layer 72 is 0.5 μm.

The polycarbonate added with methylacrylate monomer, when irradiated with ultraviolet rays, is polymerized to decrease its refractive index. Accordingly, the polycarbonate film 77 stores information in the form of a variation of refractive index when it is exposed to light 79 through a mask 78a, as shown in FIG. 17(b). In the polycarbonate film 77, the refractive index of the record pits 75 is high, while the refractive index of the remaining portions of the recording layer, i.e., the nonpit portions 76, is low. After the exposure process, the recorded information is fixed by removing residual monomer from the polycarbonate film 77 added with methylacrylate monomer. In this way, a recording layer 72a containing information recorded therein is formed.

Another transparent spacer layer 74 and a virgin recording layer 77 are successively formed on the recording layer 72a thus formed (see FIG. 17(c)). The recording layer is selectively exposed to light through another mask 78b, and the recorded information is fixed. Consequently, another recording layer 72b containing information recorded therein is formed (see FIG. 17(d)). Repeating the process as mentioned above forms an optical multi-layer recording medium having a desired number of layers.

In the manufacturing process, resin is selected so that the recording layer 72 is incompatible with the transparent spacer layer 74. Otherwise, the lower layer will melt into the coating material of the upper layer during the upper layer coating process. This compatibility problem can be solved if ultraviolet rays hardening resin, thermal hardening resin, inorganic dielectric thin film physically deposited, or the like is used for the transparent spacer layer 74. The mask exposure method employed in the manufacturing process may be substituted by the laser beam scanning method. For forming the film of polycarbonate added with methylacrylate monomer, a casting method may be used in lieu of the spin coating method.

Figure 18:
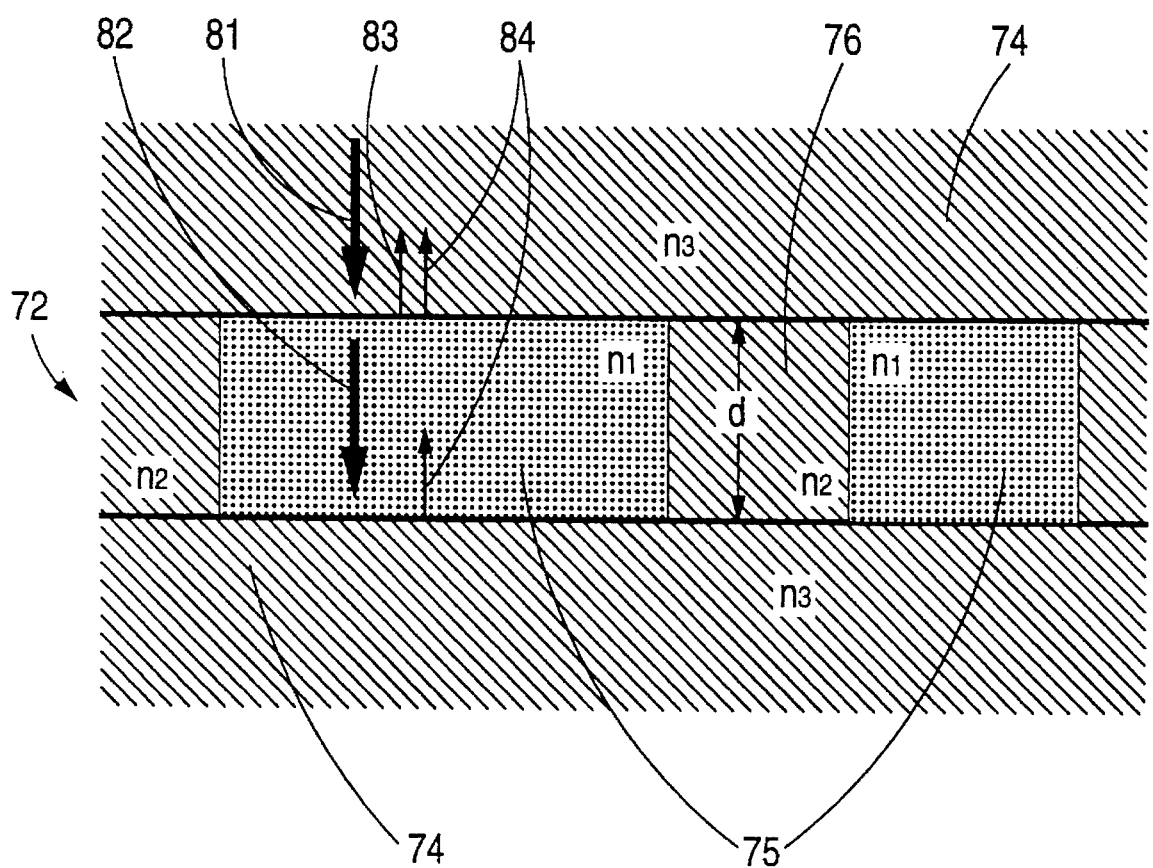
FIG. 18 is a diagram showing a model of reflection of light taking place between a recording layer and a transparent spacer.

In the optical multi-layer recording medium, the reflecting light at the interface between the recording layer 72 and the transparent spacer layer 74 can be reduced when the refractive index $n_2$ of the nonpit portion 76 of the recording layer 72 is substantially equal to the refractive index $n_3$ of the transparent spacer layer 74 (FIG. 18). In FIG. 18, $n_1$ indicates the refractive index of the record pit 75. The thickness of the transparent spacer layer 74 is preferably 1 to 100 μm, more preferably 2 to 20 μm. The thickness d of the recording layer 72 is preferably 0.1 to 2 μm, and more preferably selected to be integer times as large as ½ of the probe light wavelength. The reason for this follows. When the probe light beam 81 is vertically incident on the recording layer, and probe light beam 82 is present in the recording layer, the reflecting light 83 at the interface between the upper layer of the recording layer 72 and the transparent spacer layer 74 and the reflecting light 84 at the interface of the lower layer of the recording layer 72 and the transparent spacer layer 74 are opposite to each other, reducing scattering of light. This is based on the fact that the reflecting light caused when light goes from a medium of high refractive index to another medium of low refractive index is phase shifted by 180° from the reflecting light caused when light goes from a medium of low refractive index to another medium of high refractive index.

The signal reproduction will be easier as the refractive index difference between the record pits 75 and the nonpit portions 76 is large. However, a large refractive index difference increases the scattering of light and adversely affects the image forming characteristic of the reproducing light probe. Accordingly, the refractive index difference must be determined on the basis of a compromise between S/N of the reproducing signal and the aberration characteristic.

Figure 19:
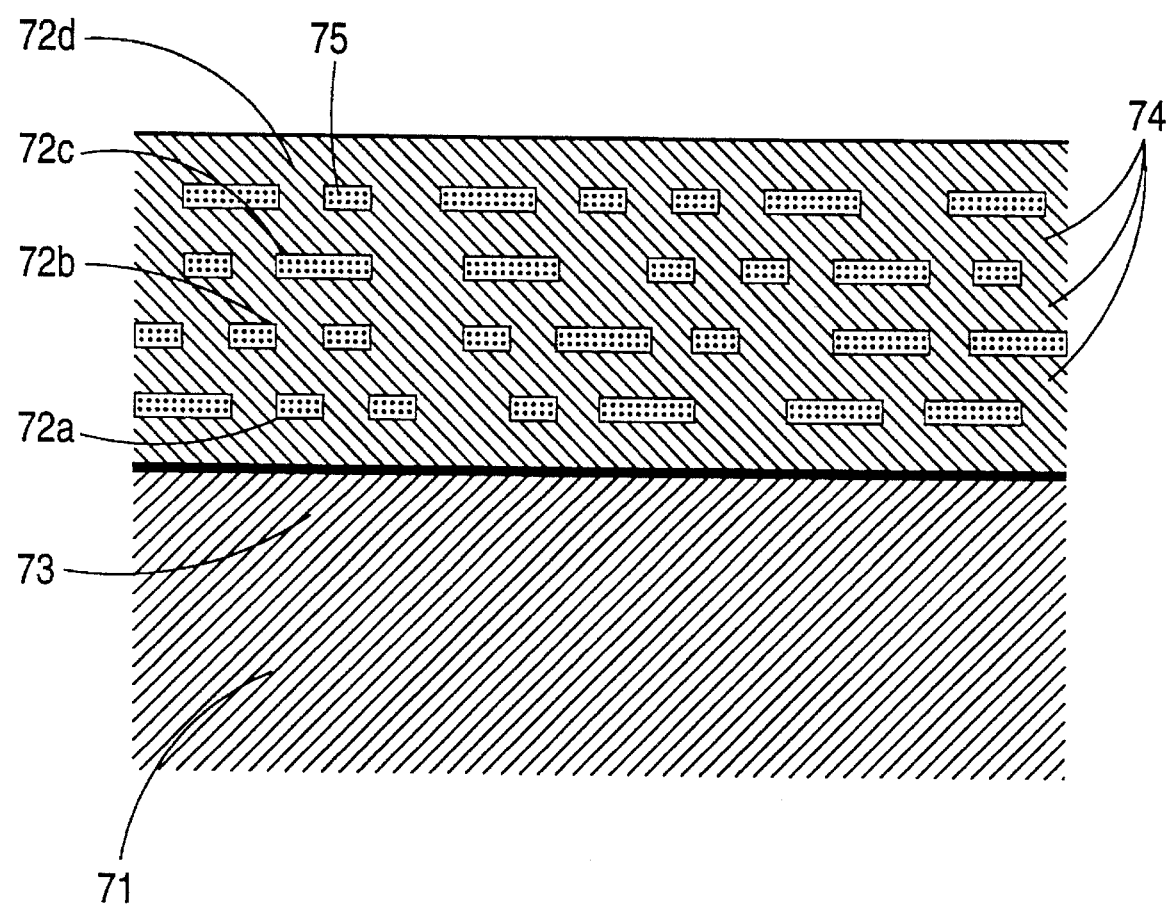
FIG. 19 is a cross sectional view showing a second structure of an optical multi-layer recording medium.
Figure 20:
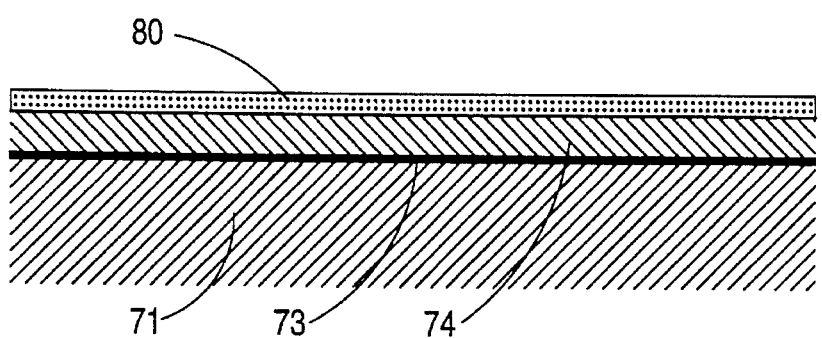
FIGS. 20.(a) to 20(d) are diagrams showing a process of manufacturing the optical multi-layer recording medium of the second structure.
Figure 20:
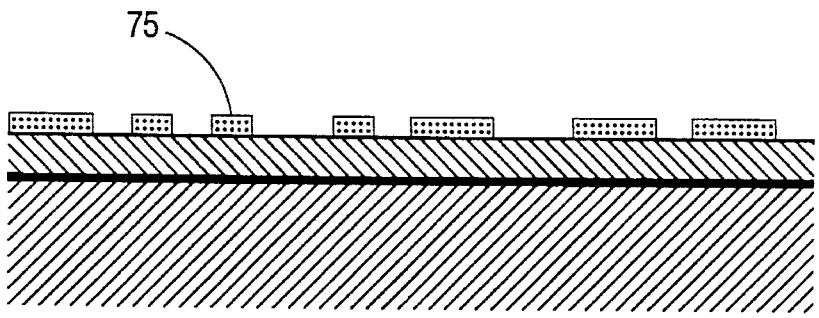
Figure 20:
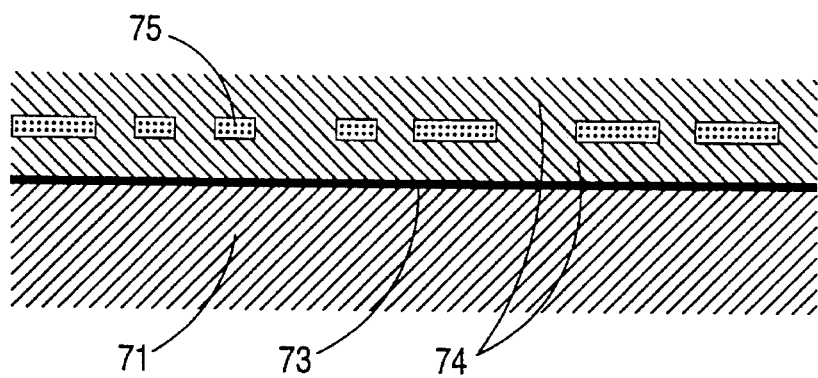
Figure 20:
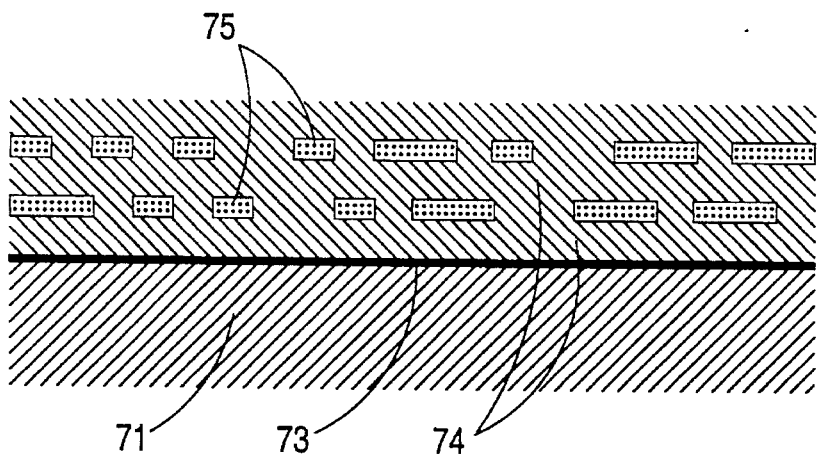

FIG. 19 is a cross sectional view showing a second structure of an optical multi-layer recording medium. In the second structure, the transparent spacer layer is integral with the nonpit portions of the recording layer. The record pits 75 are formed in a manufacturing process, which is different from that in the first structure of FIG. 16. FIGS. 20(a) to 20(d) are diagrams showing a process of manufacturing the optical multi-layer recording medium of the second structure. The manufacturing process up to the step where metal, for example, aluminum, is vapor deposited or sputtered on a substrate 71 of glass or plastic, thereby forming a reflecting film 73 thereon, is the same as that in the case of the first structure. Following the step, a transparent spacer layer 74 is formed by a spin coating method. The transparent spacer layer 74 is made of ultraviolet rays hardening resin or thermal hardening resin. Accordingly, the spacer layer is hardened when it is irradiated with ultraviolet rays or heated, after the spin coating process. An inorganic dielectric thin film 80 is vapor deposited on the transparent spacer layer 74 (FIG. 20(a)), and then record pits 75 are formed by photolithography process, as shown in FIG. 20(b). Then, the transparent spacer layer 74 is formed again by a spin coating method (FIG. 20(c)). The vapor depositing process of an inorganic dielectric thin film and the photolithography process are repeated to form a multi-layered structure (FIG. 20(d)). The manufacturing method under discussion makes use of the nature of the spin coating method that an irregularity, if not great, on the substrate is flattened. The transparent spacer layer is made of ultraviolet rays hardening resin or thermal hardening resin; otherwise, the transparent spacer layer as the lower layer will melt into the coating material of the upper layer during the spin coating process.

In the first and second structures of the optical multi-layer recording medium, the dielectric thin film for the record pits 75 may be made of inorganic dielectric material, such as $TiO_2$, $ZnS$, $ZrO_2$, $SiO_2$, or $MgF_2$. The film forming method may be any of sputtering, ion plating, CVD, and the like, in addition to the vapor deposition method. A lift-off process may be used for the photolithography technique. The dielectric thin film for the record pits may be formed by using photosetting resin (e.g., negative photo-resist) or photodegradation resin (e.g., positive photo-resist). In this case, the photolithography is easy.

In the optical multi-layer recording medium of the second structure, the material for the record pits film may be selected from among a greater number of candidates than in the recording medium of the first structure. Accordingly, a great change of refractive index is secured.

The information stored in the optical multi-layer recording medium thus manufactured can be reproduced using the optical information reproducing apparatus shown in FIG. 1, for example.

When using the optical information reproducing apparatus, the information reproducing operation is little influenced by the phase information of the recording layers layered one above the other.

Returning to FIGS. 3(a) and 3(b), an angle θ between the electric field vectors 16 and 17 indicates a phase variation caused by the record pits, i.e., a degree of modulation. The angle θ is determined by the refractive index difference in the recording layers, the thickness of the recording layer, and the wavelength of the probe light beam. The phase variation is greater as the refractive index difference between the record pit and its surrounding portion is larger, the recording layer is thicker, and the wavelength of the probe light beam is shorter. The reproduced signal becomes larger as the angle θ is larger. However, this angle is preferably set below a certain value for the following reason.

Figure 21:
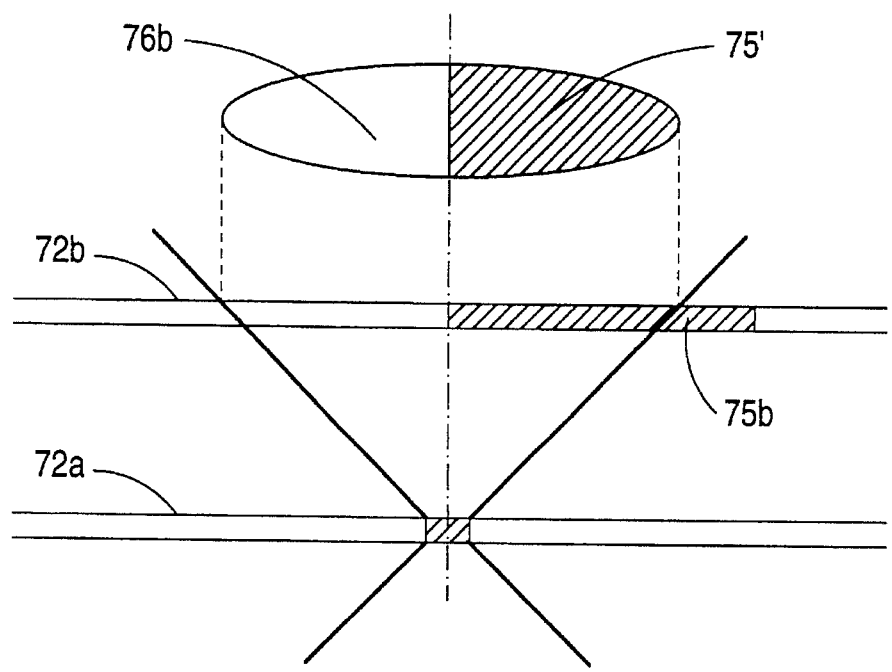
FIG. 21 is an explanatory diagram for explaining how the recording layer affects the phase of the probe light beam.

Let us consider a case where a record pit 75b of the recording layer 72b not under access causes the half of a probe light beam to phase shift by π(180°), as shown in FIG. 21. In this case, a portion 75' of the probe light beam influenced by the record pit 75b and a portion 76b not influenced are opposite to each other in phase. Thus, the half of the probe light beam (laser beam) is phase shifted by π, those portions of the probe light beam influenced and not influenced by the record pit cancel out at the focal point, and the probe light beam disappears. In the case of FIG. 21, the record pit is located extremely deviated. This seems to be an extreme case, but on average half of the circle which has sufficiently large area is occupied by the record pits when a standard coding method is applied. Where the record pit of the phase shift of π is used, the disappearance of the probe light beam occurs at a high probability. The disappearance of the probe light beam occurs also when the phase-shift of each record pit is larger than π. In this respect, it is preferable to select the phase shift to be smaller than π.

Figure 22:
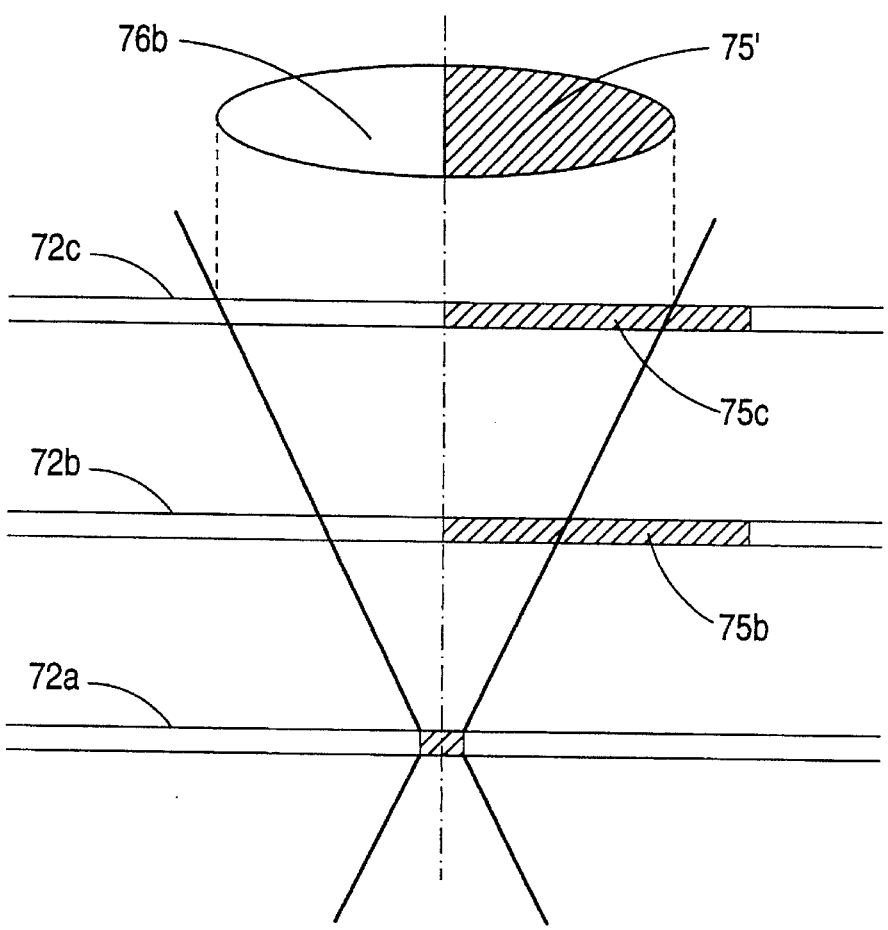
FIG. 22 is a diagram for explaining a plurality of recording layers not under access accumulatively affect the phase of the probe light beam.

The probe light beam is accumulatively influenced by the recording layers 72b and 72c not addressed, as shown in FIG. 22. In the present invention, the quantity of the phase shift of each record pit is selected to preferably be $\pi/(m-1)$ for the optical multi-layer recording medium of the transmission type and $\pi/(2m-1)$ for the recording medium of the reflection type. In the above mathematical expressions, m represents the number of recording layers.

In the optical multi-layer recording media of the first and second structures, the interlayer cross talk can be reduced when information is recorded in the recording layer in terms of differences between nonlinear optical constants. In the case of FIG. 16, this is realized in a manner that a nonlinear optical material is used for the record pits 75 of the recording layers 72a to 72d and a linear optical material (nonlinear optical constant ≈0) is used for the nonpit portions 76, and vice versa. The nonlinear optical material has such a nature that its refractive index varies in accordance with an intensity (energy density) of light received. Therefore, when a recording layer is addressed, the laser beam is concentrated thereon. Under this condition, the energy density of light increases at the location of the recording layer which receives the concentrated probe light, causing a large refractive index difference. On the other hand, the laser beam is diverged in the recording layers not under access, located above and below the recording layer under access. The result is reduction of the energy density of light, and a small refractive index difference. In this case, it is preferable that the refractive index of the record portion of the recording layer is nearly equal to that of the nonrecord portion where the light intensity is satisfactorily small.

The nonlinear optical material is preferably an organic material, such as MNA or polydiacetylene, but may be an inorganic material. The material exhibiting the multiple photon absorption (including two-photon absorption) may be used for the recording portion of the recording layer. In the case of the optical multi-layer recording medium of FIG. 16, the record pits 75 of the recording layers 72a to 72d may be made of two-photon absorption material. The nonpit portions 76 are made of the material exhibiting less two-photon absorption. Since the absorption coefficient in the two-photon absorption is proportional to the square of an intensity of light, the interlayer cross talk can be reduced according to the principle stated above. The two-photon absorption material is a rare earth element doped glass, for example. When the nonlinear optical material is used, light components of wavelengths, which are different from that of the probe light beam, is caused because of presence of higher harmonics and up-conversion. Generation of these light components is nonlinear with respect to the intensity of the probe light beam. This implies that the interlayer cross talk can be reduced using other light components than the probe light beam.

When the two-photon absorption material is used for the recording layers of the optical multi-layer recording medium of the worm type and the rewritable type, the interwrite cross talk can be removed in the write mode. The reason for this is that the absorption of the laser beam is large at a location of the recording layer which is addressed, so that a selective writing operation is possible.

For the reproduction of information from the optical multi-layer recording medium by using the nonlinear effect, viz., a reversible change of the physical property with respect to the light intensity, it is suggestible to use pulsative light of high duty ratio. This is because the quantity of change of the physical property is determined by the peak intensity of the probe light beam.

Figure 23:
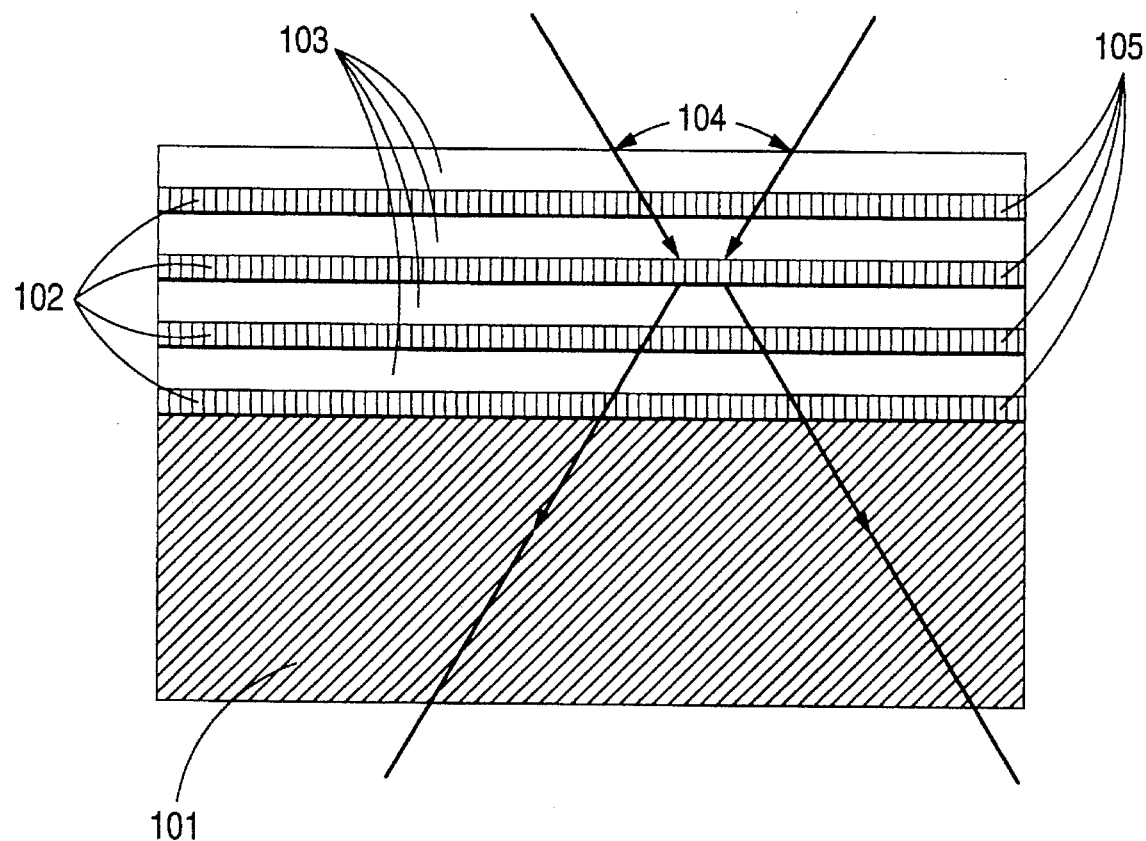
FIG. 23 is a cross sectional view showing a third structure of an optical multi-layer recording medium.

FIG. 23 is a cross sectional view showing a third structure of an optical multi-layer recording medium. In the third structure shown in FIG. 23, bismuth substituted garnet recording layers 102 and transparent spacer layers 103 are alternately layered on a glass substrate 101. Further, light absorbing layers 105 are provided in proximity to the recording layers 102. Each of the light absorbing layers 105 may be formed over the entire surface of the corresponding recording layer. Alternatively, the light absorbing layers 105, shaped like stripes, are used also as pregrooves.

Figure 24:
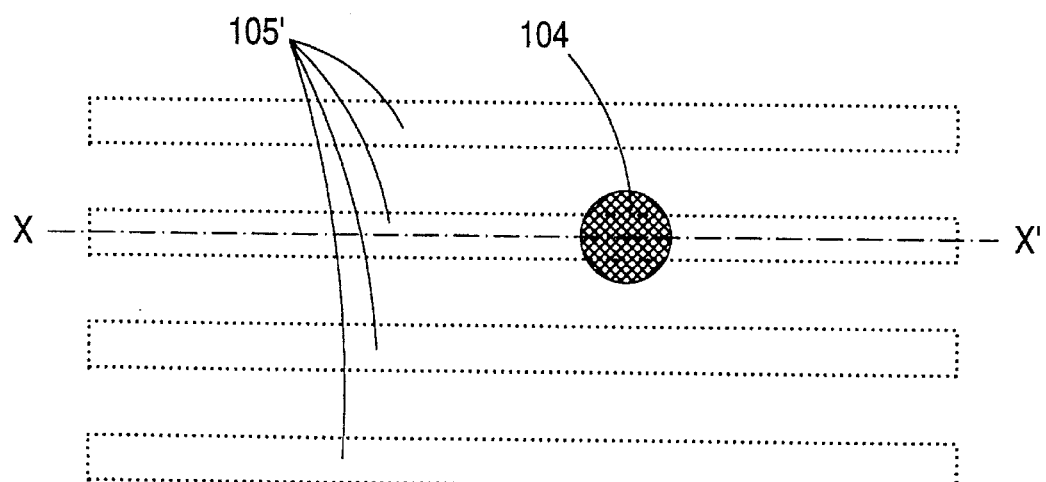
FIG. 24 is a plan view showing another structure of an optical multi-layer recording medium.

FIG. 24 is a plan view showing the optical multi-layer recording medium in which light absorbing layers 105 serve also as pregrooves 105', the illustration of FIG. 23 being a cross sectional view taken on line X—X' in FIG. 24.

Figure 25:
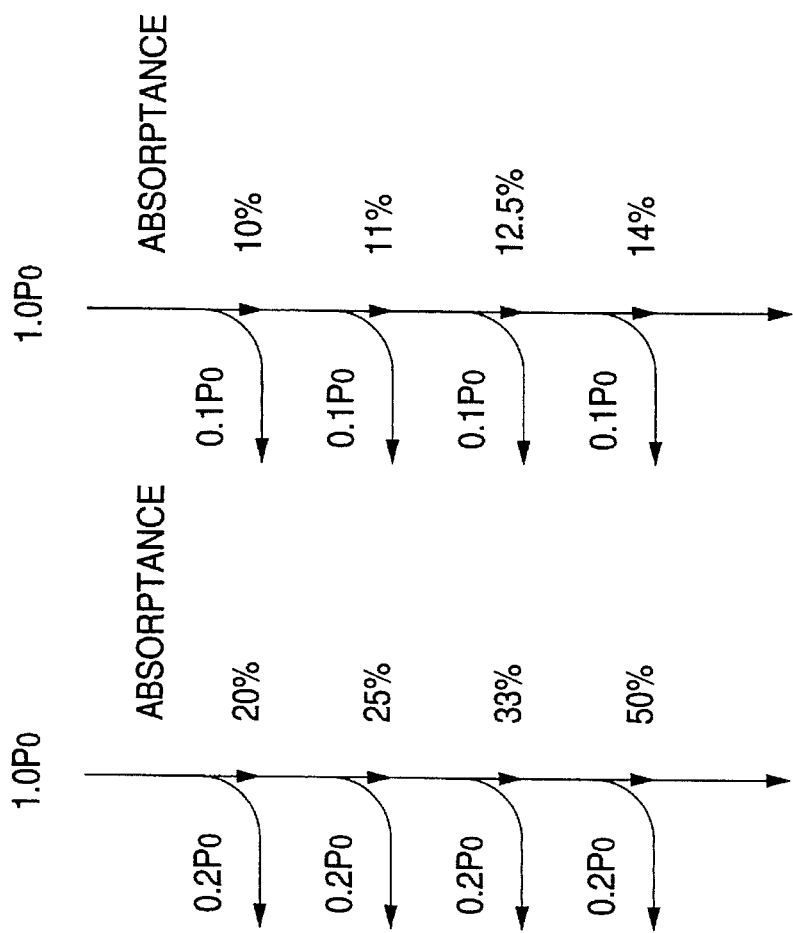
FIGS. 25(a) to 25(c) are diagrams schematically showing the distribution of laser power in the case where the absorptance values of light absorbing layers are distributed gradiently.

In this instance, the light absorbing layers have a gradient of absorptance in the ascending order from the highest recording layer to the lowest recording layer, which is closest to the substrate. FIGS. 25(a) to 25(c) are explanatory diagrams showing the absorptance gradient. As shown in FIG. 25(a), the optical multi-layer recording medium has such a structure that light absorbing layers 105a to 105d, recording layers 102a to 102d, and spacer layers 103 are alternately layered on the glass substrate 101. For example, the absorptance of the light absorbing layer 105d as the highest layer is 20%; the light absorbing layer 105c, 25%; the light absorbing layer 105b, 33%; and the light absorbing layer 105a as the lowest layer closest to the substrate, 50%. In such an array of the light absorbing layers, the power of 0.2 $P_0$ is uniformly distributed to the recording layers 102a to 102d. Here, $P_0$ is the power of a laser beam 104 to write. In an example of FIG. 25(c), the absorptance values of the light absorbing layers 105d to 105a are 10%, 11%, 12.5%, and 14%, respectively. In this arrangement of the light absorbing layers, the power of 0.1 $P_0$ is uniformly distributed to the respective recording layers.

Figure 26:
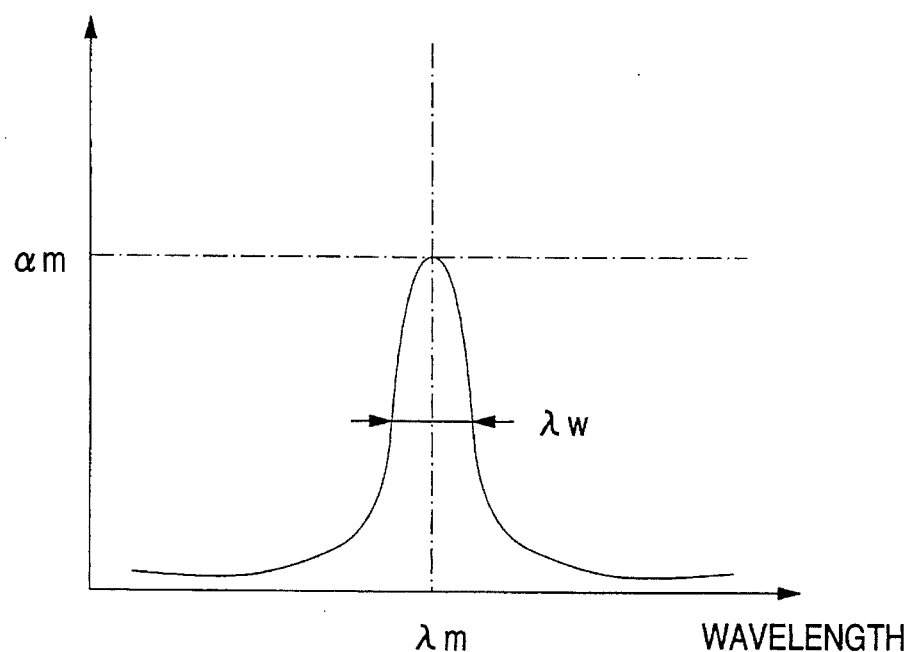
FIG. 26 is a graph showing a variation of absorption coefficient of a desirable light absorbing layer with respect to the wavelength of light received.

It is preferable that the material of the light absorbing layers 105 has an absorption coefficient in its own way, and a wavelength selectivity. The absorption coefficient of the light absorbing layer 105 is preferably 10 to 100 times as large as that of the material of the recording layer 102, such as bismuth substituted garnet. The light absorbing layer, when its absorption coefficient is too small, cannot exhibit its light absorbing function. When it is too large, the absorptance control is difficult. A preferable wavelength selectivity of the light absorbing layer 105 is as shown in FIG. 26. As shown, only light of a specific wavelength $\lambda_m$ is absorbed. To form the recording layer 102, a post anneal at about 600° C. is required as will be described later. Therefore, the light absorbing layer 105 must withstand this temperature.

Figure 27:
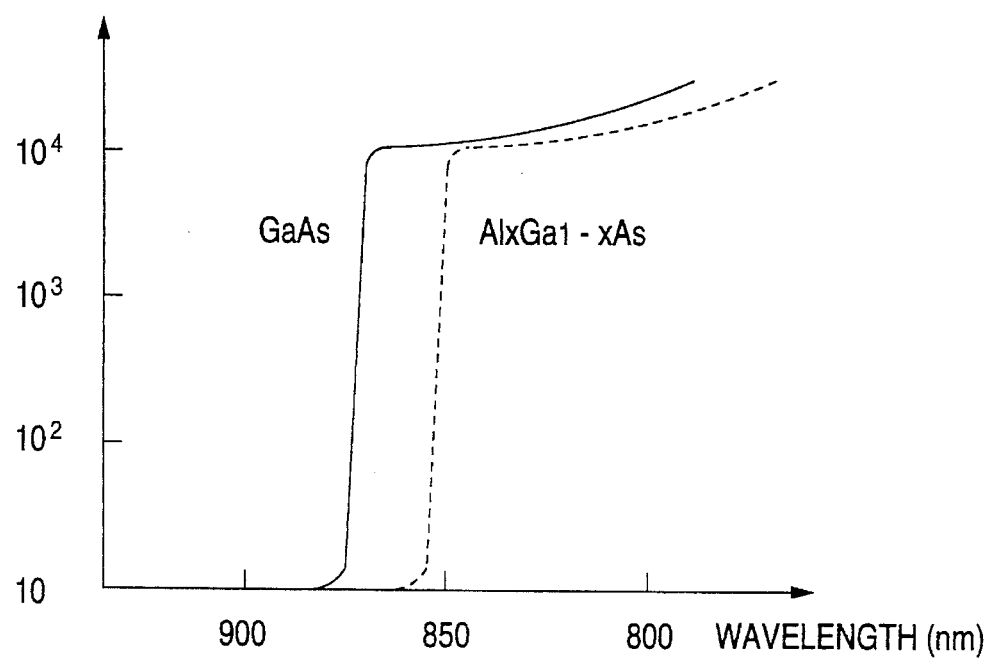
FIG. 27 is a graph showing a variation of absorption coefficient of a direct energy-gap semiconductor with respect to the wavelength of light received.
Figure 28:
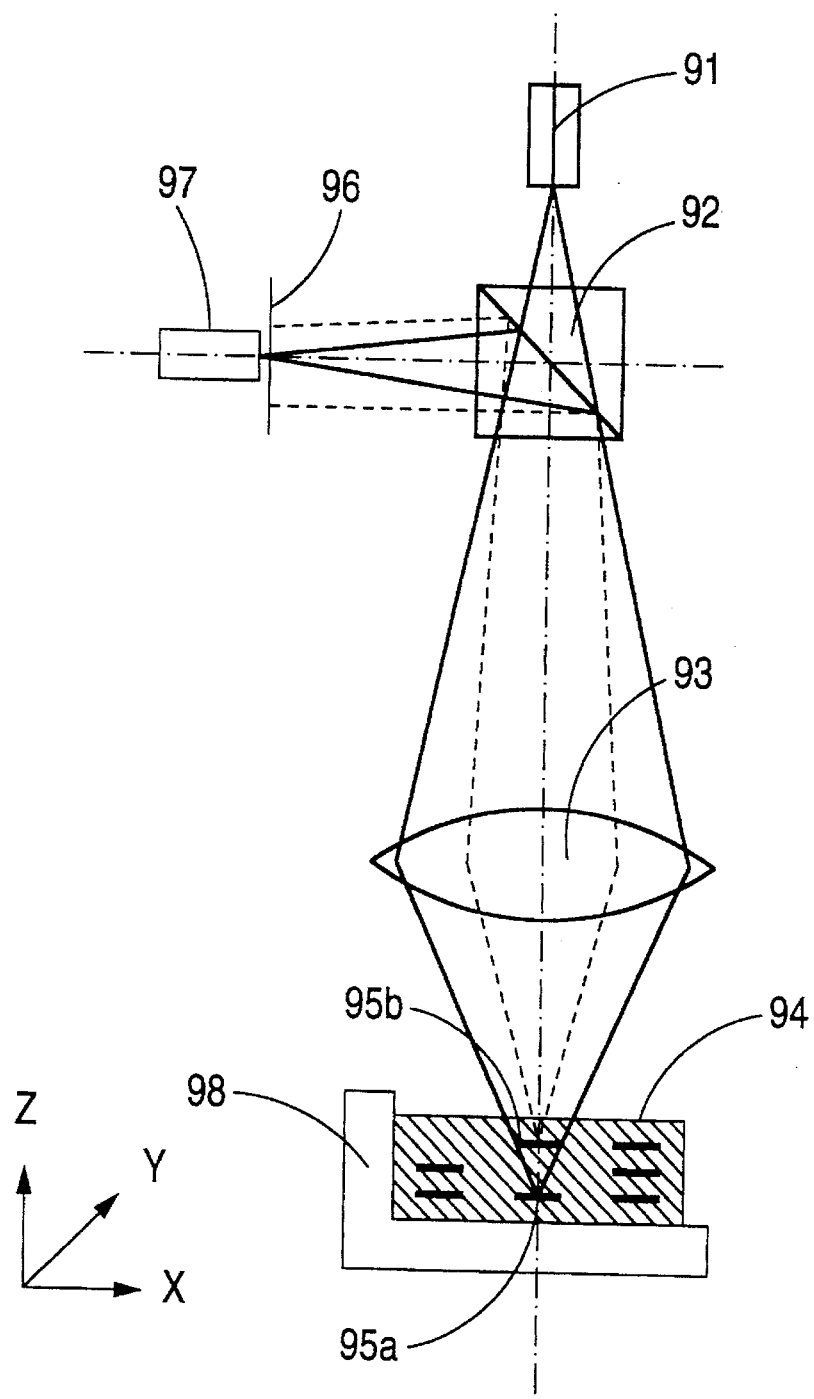
FIG. 28 is a diagram schematically showing a conventional information reproducing apparatus for reading information out of an optical multi-layer recording medium in which the information is three-dimensionally stored.

Absorption coefficient of rare earth element doped glass, selected on the conditions as referred to above, varies with respect to the wavelength of light received, as shown in FIG. 26. The half-width $\lambda_w$ of the absorption band is narrow, 1 nm. The peak $\alpha_m$ of the light absorption coefficient is several tens cm$^{-1}$ at most. Accordingly, it is rather difficult to apply this material for the light absorbing layers. On the other hand, it is known that in the case of direct transition semiconductor materials, such as GaAs, InP, CdS, CdSe, ZnSe, and ZnS, the absorption coefficient in the vicinity of the band-gap exhibits an excellent wavelength dependency. A solid line in FIG. 27 indicates a light absorption characteristic of GaAs. The direct transition semiconductor material absorbs not only light of a specific wavelength, but also light of wavelengths shorter than the cut-off wavelength (wavelength corresponding to the band gap) as seen from FIG. 27. In the case of mixed crystal, such as $Al_xG_{al-x}$, the cut-off wavelength can be continuously changed as indicated by a broken line in FIG. 27.

For the above reasons, in the present invention, a direct transition semiconductor material is used for the light absorbing layer 105. Light of a wavelength shorter than the cut-off wavelength is used for writing information, light of a wavelength longer than the cut-off wavelength is used for reading out the information. As a result, attenuation of the probe light beam in the recording and reproducing modes can be reduced. The cut-off wavelengths of the recording layers may be selected in such an order that the cut-off wavelength of the highest layer is the shortest, and that of the lowest layer is the longest.

The material of the spacer layer 103 is preferably a dielectric material, such as $SiO_2$, $Al_2O_3$, or $TiO_2$ for the reasons to be described hereinafter. The refractive index of the bismuth substituted garnet for the recording layers is approximately 2.0, the refractive index of GaAs for the light absorbing layers is approximately 3.5. The reflection at the boundary between the adjacent layers is reduced as the difference of refractive index between the layers is smaller. To prevent the scattering of light, $TiO_2$ is more preferable, which has the refractive index as a medium value between the refractive indices of the bismuth substituted garnet and GaAs.

A method of manufacturing the optical multi-layer recording medium shown in FIG. 23 will be described briefly. To form a light absorbing layer 105d, a polycrystalline film of GaAs, for example, is formed, 0.1 to 1.0 μm thick, on the glass substrate 101 by a MOCVD method or a sputtering method. The thickness of the light absorbing layer 105d is selected so as to gain an absorptance of a specific design value. In a case where the absorption coefficient is $1 \times 10^4$ cm$^{-1}$ and the absorptance is 10%, the thickness of the light absorbing layer 105d is 0.1 μm. 0.22 μm thickness is selected for 20% absorptance, and 0.4 μm thick, for 33% absorptance. Then, by photolithography process, the light absorbing layer 105d is shaped like a stripe to form a pregroove. Then, a passivation film (not shown) of SiNx, approximately 100Å thick, is deposited on the light absorbing layer 105d. Bismuth substituted garnet of BiDyFeAlO, for example, is deposited thereover, thereby to form a recording layer 102d, by a sputtering method or a thermal decomposing method. The thickness of the recording layer 102d ranges 0.1 to 1.0 μm, typically 0.3 μm. Then, the structure is subjected to a post anneal at 500° to 700° C. for approximately 1 to 10 hours. The bismuth substituted garnet, after the post anneal process, is crystallized to exhibit the nature of photomagnetic material. The post anneal is carried out in an oxygen atmosphere, e.g., in the air. To protect GaAs easy to be oxidized, the passivation film is formed on the light absorbing layer 105d, as already stated. To form the spacer layer 103, $SiO_2$, $Al_2O_3$, or $TiO_2$ is deposited on the recording layer 102d after the post anneal process by a sputtering method or a CVD method. The thickness of the spacer layer 103 ranges 2 to 100 μm, typically 30 μm. When repeating the process as mentioned, an optical multi-layer recording medium having the sectional structure as shown in FIG. 23 is manufactured.

It is evident that the optical multi-layer recording medium of the present invention may take any of the shapes, such as disk, card, and tape.

As described above, in the optical information reproducing apparatus and the optical multi-layer recording medium according to the present invention, it is possible to reduce the noise caused by the information recorded in the recording layer not under access, when information is reproduced from the optical multi-layer recording medium. Further, the present invention is applicable for the optical multi-layer recording medium which uses a variation of any of transmittance, reflectivity, refractive index and plane of polarization for representing information to be recorded therein.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An optical information reproducing apparatus comprising an optical recording medium in which information is recorded in a state that the information is optically reproduced, and an optical head for reproducing the recorded information from the recording medium during relative movement with respect to the recording medium, said optical head comprising:

a light source unit for emitting two laser beams;

a projection optical system for projecting the two laser beams emitted from light source unit onto the recording medium; and means for detecting a difference between electric field vectors of the two laser beams transmitted through the recording medium or reflected by the recording medium.

2. The optical information reproducing apparatus according to claim 1, wherein said optical recording medium includes a multi-layer recording medium consisting of a plurality of recording layers.

3. The optical information reproducing apparatus according to claim 2, wherein a ratio s/r is set in a range between 0.5 and 6 where s is a distance (μm) of laser beam spots on a recording layer of said recording medium, and r is a radius (μm) of each of the laser beam spots.

4. The optical information reproducing apparatus according to claim 3, wherein a ratio s/r is set in a range between 0.5 and 2.

5. The optical information reproducing apparatus according to claim 1, wherein said light source unit includes a laser light source, light splitting means, and a phase shifter, and said detecting means includes optical difference detecting means including light multiplexing means and light detecting means.

6. The optical information reproducing apparatus according to claim 5, wherein a zero-adjust optical difference detecting means is provided between said light source unit and said optical recording medium, and a phase shift quantity of said phase shifter is variable through an external control, said shift quantity being controlled by an output signal from said zero-adjust optical difference detecting means.

7. The optical information reproducing apparatus according to claims 5, wherein said light splitting means splits a laser beam into two laser beams of which the planes of polarization are orthogonal to each other.

8. The optical information reproducing apparatus according to claim 5, wherein a zero-adjust optical difference detecting means is provided between said light source unit and said optical recording medium, and a splitting ratio of said light splitting means is variable through an external control, said splitting ratio being controlled by an output signal from said zero-adjust optical difference detecting means.

9. The optical information reproducing apparatus according to claim 1, wherein said light source unit includes a laser light source and light splitting means, and said detecting means includes light multiplexing means, a phase shifter, and light detecting means.

10. The optical information reproducing apparatus according to claim 9, wherein said light splitting means splits a laser beam into two laser beams of which the planes of polarization are orthogonal to each other.

11. An optical recording medium comprising a substrate transparent to two laser beams, and a recording layer formed on said transparent substrate, said recording layer including a first region of a first refractive index and a second region of a second refractive index different than the first refractive index, wherein the difference of recorded region refractive indices are detected on the basis of the laser beams transmitted through said transparent substrate.

12. The optical recording medium according to claim 11, wherein a phase shift of one of the two laser beams transmitted through the first region or the second region of said recording layer is within ½ wavelength.

13. The optical recording medium according to claim 12, wherein an m number of recording layers are layered with spacer layers each being between the adjacent recording layer, and the phase shift of one of the two laser beams transmitted through the first region or the second region of said recording layer is within (½)/(m−1) wavelength.

14. The optical recording medium according to claim 13, wherein the refractive indices of said first regions or said spacer layers are equal to each other.

15. The optical recording medium according to claim 14, wherein a dielectric thickness of said recording layer is an integer times as large as ½ wavelength.

16. An optical recording medium comprising a substrate, a reflecting layer on said substrate for reflecting two laser beams, and a recording layer on said reflecting layer, said recording layer including a first region of a first refractive index and a second region of a second refractive index different than the first respective index, wherein the difference of recorded region refractive indices are detected on the basis of the laser beams reflected by said reflecting layer.

17. The optical recording medium according to claim 16, wherein a phase shift of one of the two laser beams transmitted through the first region or the second region of said recording layer is within ½ wavelength.

18. The optical recording medium according to claim 16, wherein an m number of recording layers are layered with spacer layers each being between the adjacent recording layer, and the phase shift of one of the two laser beams transmitted through the first region or the second region of said recording layer is within $(½)/(m-1)$ wavelength.

19. The optical recording medium according to claim 18, wherein the refractive indices of said first regions or said spacer layers are equal to each other.

20. The optical recording medium according to claim 16, wherein a dielectric thickness of said recording layer is an integer times as large as ½ wavelength.

21. An optical multi-layer recording medium comprising a substrate, recording layers and transparent spacer layers alternately layered on said substrate, said recording layers each being made of a material having a physical property nonlinearly varying with intensity of a light beam received.

22. The optical multi-layer recording medium according to claim 21, wherein said nonlinear variation of the physical property results from a nonlinear optical effect.

23. The optical multi-layer recording medium according to claim 21, wherein said nonlinear variation of the physical property results from a multi-photon absorption.

24. An optical multi-layer recording medium in which recording layers and transparent spacer layers are alternately layered on a transparent substrate or a substrate with a reflecting surface, wherein light absorption layers, independent from said recording layers and having a higher absorption coefficient against a written beam than said recording layers, are provided in proximity to said recording layers.

25. The optical multi-layer recording medium according to claim 24, wherein said light absorbing layers serve also as pregrooves.

26. The optical multi-layer recording medium according to claim 24, wherein the absorptance of each of said light absorbing layers depends on the wavelength of light received.

27. The optical multi-layer recording medium according to claim 24, wherein said light absorbing layers are made of direct transition semiconductor.

28. An optical multi-layer recording medium in which recording layers, transparent spacer layers, and light absorption layers in proximity to said recording layers are alternately layered on a transparent substrate or a substrate with a reflecting surface, wherein the light absorbing layers have a gradient of absorptance in ascending order from a highest recording layer to a lowest recording layer closest to the substrate.

29. A method for recording information in an optical multi-layer recording medium including a substrate, recording layers and transparent spacer layers alternatively layered on said substrate, said recording layers each being made of a material having a physical property nonlinearly varying with an intensity of a light beam received, by means of light of a first wavelength capable of nonlinearly varying the physical property.

30. The method according to claim 29, wherein light to read information from said optical multi-layer recording medium comprises light of the first wavelength for recording the information and light of a second wavelength which is different from said first wavelength for reading the information.

31. An optical information reproducing apparatus comprising a multi-layer optical recording medium in which information is recorded in a state that the information is optically reproduced, and an optical head for reproducing the recorded information from the recording medium during relative movement with respect to the recording medium, said optical head comprising:

a light source unit for emitting two laser beams;

a projection optical system for projecting the two laser beams emitted from the light source unit onto the recording medium;

two photo sensing devices to detect correspondent said laser beams transmitted through the recording medium or reflected by the recording medium; and means for taking a difference between the electrical signals outputted from said photo sensing devices.

32. An optical information reproducing apparatus according to claim 31, wherein zero-adjust optical difference detecting means is provided between said light source unit and said multi-layer optical recording medium, and the intensity ratio of said two laser beams is controlled by an optical signal from said zero-adjust detecting means.

* * * * *

UNITED STATES PATENT AND TRADEMARK OFFICE
CERTIFICATE OF CORRECTION

PATENT NO. : 5,559,784
DATED : September 24, 1996
INVENTOR(S) : Takeshi OTA

It is certified that error appears in the above-indentified patent and that said Letters Patent is hereby corrected as shown below:

Col 1, line 2
Title page, item [54], In the Title, line 2, "BEAM" should read --BEAMS--.

Claim 3, column 19, line 56, "s" should read --s--.

Claim 3, column 19, line 57, "r" should read --r--.

Signed and Sealed this

Third Day of June, 1997

Attest:

BRUCE LEHMAN

Attesting Officer    Commissioner of Patents and Trademarks